(12) United States Patent
Brandwine

(10) Patent No.: US 9,374,244 B1
(45) Date of Patent: Jun. 21, 2016

(54) REMOTE BROWSING SESSION MANAGEMENT

(75) Inventor: Eric Jason Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 114 days.

(21) Appl. No.: 13/406,112

(22) Filed: Feb. 27, 2012

(51) Int. Cl.
    *H04L 21/00* (2006.01)

(52) U.S. Cl.
    CPC ...................................... *H04L 21/00* (2013.01)

(58) Field of Classification Search
    CPC ... H04L 29/06775; H04L 21/00; G06F 21/33; G06F 21/64; G06F 21/00; H04N 2201/3235
    USPC ......................................................... 713/168
    See application file for complete search history.

(56) References Cited

U.S. PATENT DOCUMENTS

| | | | |
|---|---|---|---|
| 5,634,064 | A | 5/1997 | Warnock et al. |
| 5,872,850 | A | 2/1999 | Klein et al. |
| 5,961,593 | A | 10/1999 | Gabber et al. |
| 5,982,506 | A * | 11/1999 | Kara ............................. 358/405 |
| 6,049,812 | A | 4/2000 | Bertram et al. |
| 6,108,637 | A | 8/2000 | Blumenau |
| 6,138,156 | A | 10/2000 | Fletcher et al. |
| 6,195,679 | B1 | 2/2001 | Bauersfeld et al. |
| 6,202,151 | B1 * | 3/2001 | Musgrave .............. G06Q 20/04 713/170 |
| 6,230,266 | B1 * | 5/2001 | Perlman et al. ................ 713/158 |
| 6,411,966 | B1 * | 6/2002 | Kwan et al. |
| 6,430,624 | B1 | 8/2002 | Jamtgaard et al. |
| 6,549,941 | B1 | 4/2003 | Jaquith et al. |
| 6,560,620 | B1 | 5/2003 | Ching |
| 6,625,624 | B1 | 9/2003 | Chen et al. |
| 6,704,024 | B2 | 3/2004 | Robotham et al. |
| 6,785,864 | B1 | 8/2004 | Te et al. |
| 6,871,236 | B2 | 3/2005 | Fishman et al. |
| 6,944,665 | B2 | 9/2005 | Brown et al. |
| 6,963,850 | B1 | 11/2005 | Bezos et al. |

(Continued)

FOREIGN PATENT DOCUMENTS

WO    WO 2013/003631 A2    1/2013

OTHER PUBLICATIONS

Gulbrandsen et al., "A DNS RR for specifying the location of services (DNS SRV)", RFC 2782, 2000.*

(Continued)

*Primary Examiner* — O. C. Vostal
(74) *Attorney, Agent, or Firm* — Knobbe, Martens, Olson & Bear, LLP

(57) ABSTRACT

A process is directed to the generation and processing of server identification data by a network computing provider. A client computing device transmits data identifying a server associated with a content source. The identification data can include a digital certificate signed by a third-party certificate authority, a DNS record from a third-party DNS server, etc. The network computing provider comprises one or more physical computing devices for processing the identification data received from any number of client computing devices. The network computing provider can alert the client computing device, content source, or DNS server when erroneous or potentially fraudulent identification data is detected. The network computing provider can also store the identification data and provide content sources and DNS servers with access to the identification data received from client computing devices.

28 Claims, 19 Drawing Sheets

(56) References Cited

U.S. PATENT DOCUMENTS

| | | | |
|---|---|---|---|
| 7,003,442 B1 | 2/2006 | Tsuda | |
| 7,051,084 B1 | 5/2006 | Hayton et al. | |
| 7,051,206 B1* | 5/2006 | Giest | G06Q 20/3674 380/282 |
| 7,054,952 B1 | 5/2006 | Schwerdtfeger et al. | |
| 7,085,736 B2 | 8/2006 | Keezer et al. | |
| 7,089,197 B1* | 8/2006 | de Freitas | G06Q 10/087 370/352 |
| 7,124,170 B1* | 10/2006 | Sibert | 709/216 |
| 7,133,846 B1* | 11/2006 | Ginter et al. | 705/54 |
| 7,159,023 B2 | 1/2007 | Tufts | |
| 7,171,478 B2 | 1/2007 | Lueckhoff et al. | |
| 7,191,211 B2 | 3/2007 | Tuli | |
| 7,353,252 B1 | 4/2008 | Yang et al. | |
| 7,373,313 B1 | 5/2008 | Kahle et al. | |
| 7,426,750 B2* | 9/2008 | Cooper et al. | 726/26 |
| 7,484,089 B1* | 1/2009 | Kogen et al. | 713/156 |
| 7,543,059 B2 | 6/2009 | Johnson et al. | |
| 7,546,259 B1* | 6/2009 | Manton | 705/35 |
| 7,792,944 B2 | 9/2010 | DeSantis et al. | |
| 7,831,582 B1 | 11/2010 | Scofield et al. | |
| 7,865,720 B2* | 1/2011 | Little et al. | 713/156 |
| 7,975,000 B2 | 7/2011 | Dixon et al. | |
| 7,996,912 B2 | 8/2011 | Spalink et al. | |
| 8,010,545 B2 | 8/2011 | Stefik et al. | |
| 8,015,496 B1 | 9/2011 | Rogers | |
| 8,060,463 B1 | 11/2011 | Spiegel | |
| 8,073,850 B1 | 12/2011 | Hubbard et al. | |
| 8,103,742 B1 | 1/2012 | Green | |
| 8,171,085 B1* | 5/2012 | Tevanian, Jr. | 709/206 |
| 8,185,621 B2 | 5/2012 | Kasha | |
| 8,249,904 B1 | 8/2012 | DeSantis et al. | |
| 8,271,887 B2 | 9/2012 | Offer et al. | |
| 8,316,124 B1 | 11/2012 | Baumback et al. | |
| 8,336,049 B2 | 12/2012 | Medovich | |
| 8,392,980 B1* | 3/2013 | Ahrens et al. | 726/10 |
| 8,429,734 B2* | 4/2013 | Agbabian | H04L 63/1416 380/232 |
| 8,560,651 B2* | 10/2013 | Venkataswami et al. | 709/223 |
| 8,683,195 B2* | 3/2014 | Shen | 713/155 |
| 8,776,214 B1* | 7/2014 | Johansson | 726/18 |
| 2001/0039490 A1 | 11/2001 | Verbitsky et al. | |
| 2001/0051996 A1* | 12/2001 | Cooper et al. | 709/217 |
| 2002/0016925 A1* | 2/2002 | Pennec et al. | 713/201 |
| 2002/0030703 A1 | 3/2002 | Robertson et al. | |
| 2002/0184493 A1* | 12/2002 | Rees | 713/158 |
| 2002/0194302 A1 | 12/2002 | Blumberg | |
| 2003/0023712 A1 | 1/2003 | Zhao et al. | |
| 2003/0041106 A1 | 2/2003 | Tuli | |
| 2003/0097592 A1* | 5/2003 | Adusumilli | 713/201 |
| 2003/0126433 A1* | 7/2003 | Hui | 713/158 |
| 2004/0030887 A1* | 2/2004 | Harrisville-Wolff et al. | 713/155 |
| 2004/0083294 A1 | 4/2004 | Lewis | |
| 2004/0093493 A1* | 5/2004 | Bisbee et al. | 713/156 |
| 2004/0139208 A1 | 7/2004 | Tuli | |
| 2004/0143579 A1* | 7/2004 | Nakazawa | 707/10 |
| 2004/0181613 A1 | 9/2004 | Hashimoto et al. | |
| 2004/0205448 A1 | 10/2004 | Grefenstette et al. | |
| 2004/0220905 A1 | 11/2004 | Chen et al. | |
| 2004/0228335 A1* | 11/2004 | Park et al. | 370/352 |
| 2004/0243622 A1 | 12/2004 | Morisawa | |
| 2005/0010863 A1 | 1/2005 | Zernik | |
| 2005/0015587 A1* | 1/2005 | Stransky | 713/156 |
| 2005/0060643 A1 | 3/2005 | Glass et al. | |
| 2005/0085931 A1* | 4/2005 | Willeby | G06Q 20/04 700/89 |
| 2005/0138382 A1 | 6/2005 | Hougaard et al. | |
| 2005/0183039 A1 | 8/2005 | Revis | |
| 2005/0246193 A1 | 11/2005 | Roever et al. | |
| 2005/0255829 A1* | 11/2005 | Kirkup et al. | 455/410 |
| 2006/0085766 A1 | 4/2006 | Dominowska et al. | |
| 2006/0095336 A1 | 5/2006 | Heckerman et al. | |
| 2006/0122889 A1 | 6/2006 | Burdick et al. | |
| 2006/0123092 A1* | 6/2006 | Madams et al. | 709/206 |
| 2006/0168510 A1 | 7/2006 | Bryar et al. | |
| 2006/0184421 A1 | 8/2006 | Lipsky et al. | |
| 2006/0202468 A1* | 9/2006 | Phillips et al. | 283/72 |
| 2006/0248442 A1 | 11/2006 | Rosenstein et al. | |
| 2006/0277167 A1 | 12/2006 | Gross et al. | |
| 2006/0280121 A1* | 12/2006 | Matoba | 370/235 |
| 2006/0294366 A1* | 12/2006 | Nadalin et al. | 713/156 |
| 2006/0294461 A1 | 12/2006 | Nadamoto et al. | |
| 2007/0022072 A1 | 1/2007 | Kao et al. | |
| 2007/0027672 A1 | 2/2007 | Decary et al. | |
| 2007/0094241 A1 | 4/2007 | Blackwell et al. | |
| 2007/0118740 A1* | 5/2007 | Deishi | 713/158 |
| 2007/0124693 A1 | 5/2007 | Dominowska et al. | |
| 2007/0139430 A1 | 6/2007 | Korn et al. | |
| 2007/0150727 A1* | 6/2007 | Miyazawa | 713/158 |
| 2007/0150737 A1* | 6/2007 | Parupudi et al. | 713/175 |
| 2007/0240160 A1 | 10/2007 | Paterson-Jones et al. | |
| 2007/0288589 A1 | 12/2007 | Chen et al. | |
| 2008/0028334 A1 | 1/2008 | De Mes | |
| 2008/0104502 A1 | 5/2008 | Olston | |
| 2008/0148401 A1* | 6/2008 | Shen | 726/22 |
| 2008/0155691 A1* | 6/2008 | Fossen et al. | 726/22 |
| 2008/0183672 A1 | 7/2008 | Canon et al. | |
| 2008/0184128 A1 | 7/2008 | Swenson et al. | |
| 2008/0189770 A1* | 8/2008 | Sachtjen | 726/4 |
| 2008/0320225 A1 | 12/2008 | Panzer et al. | |
| 2009/0006258 A1* | 1/2009 | Ross | 705/59 |
| 2009/0012969 A1 | 1/2009 | Rail et al. | |
| 2009/0063854 A1* | 3/2009 | Parkinson | 713/158 |
| 2009/0089859 A1* | 4/2009 | Cook | H04L 12/585 726/3 |
| 2009/0103470 A1* | 4/2009 | Candelore | 370/315 |
| 2009/0164597 A1* | 6/2009 | Shuster | 709/206 |
| 2009/0164924 A1 | 6/2009 | Flake et al. | |
| 2009/0198618 A1* | 8/2009 | Chan et al. | 705/66 |
| 2009/0204478 A1 | 8/2009 | Kaib et al. | |
| 2009/0217199 A1 | 8/2009 | Hara et al. | |
| 2009/0240717 A1* | 9/2009 | Mimatsu | 707/101 |
| 2009/0248680 A1 | 10/2009 | Kalavade | |
| 2009/0254867 A1 | 10/2009 | Farouki et al. | |
| 2009/0282021 A1 | 11/2009 | Bennett | |
| 2009/0287698 A1 | 11/2009 | Marmaros et al. | |
| 2009/0327914 A1 | 12/2009 | Adar et al. | |
| 2010/0031028 A1* | 2/2010 | Adams et al. | 713/156 |
| 2010/0036740 A1 | 2/2010 | Barashi | |
| 2010/0048296 A1* | 2/2010 | Adiraju | 463/29 |
| 2010/0057639 A1 | 3/2010 | Schwarz et al. | |
| 2010/0070569 A1* | 3/2010 | Turakhia | 709/203 |
| 2010/0125507 A1 | 5/2010 | Tarantino, III et al. | |
| 2010/0131594 A1 | 5/2010 | Kashimoto | |
| 2010/0131646 A1* | 5/2010 | Drako | 709/225 |
| 2010/0138293 A1 | 6/2010 | Ramer et al. | |
| 2010/0144314 A1* | 6/2010 | Sherkin et al. | 455/411 |
| 2010/0185864 A1 | 7/2010 | Gerdes et al. | 713/175 |
| 2010/0218106 A1 | 8/2010 | Chen et al. | |
| 2010/0223470 A1* | 9/2010 | Lord et al. | 713/175 |
| 2010/0293190 A1 | 11/2010 | Kaiser et al. | |
| 2010/0312788 A1 | 12/2010 | Bailey | |
| 2010/0318892 A1 | 12/2010 | Teevan et al. | |
| 2010/0332513 A1 | 12/2010 | Azar et al. | |
| 2011/0010762 A1* | 1/2011 | Nijdam et al. | 726/5 |
| 2011/0022957 A1 | 1/2011 | Lee | |
| 2011/0029854 A1 | 2/2011 | Nashi et al. | |
| 2011/0055203 A1 | 3/2011 | Gutt et al. | |
| 2011/0072502 A1* | 3/2011 | Song et al. | 726/9 |
| 2011/0078140 A1 | 3/2011 | Dube et al. | |
| 2011/0078705 A1 | 3/2011 | Maclinovsky et al. | |
| 2011/0091039 A1* | 4/2011 | Spitz | G06F 21/575 380/260 |
| 2011/0119661 A1 | 5/2011 | Agrawal et al. | |
| 2011/0154028 A1* | 6/2011 | Kirkup et al. | 713/158 |
| 2011/0161849 A1 | 6/2011 | Stallings et al. | |
| 2011/0173177 A1 | 7/2011 | Junqueira et al. | |
| 2011/0173637 A1 | 7/2011 | Brandwine et al. | |
| 2011/0178868 A1 | 7/2011 | Garg et al. | |
| 2011/0185025 A1 | 7/2011 | Cherukuri et al. | |
| 2011/0191327 A1 | 8/2011 | Lee | |
| 2011/0197121 A1 | 8/2011 | Kletter | |
| 2011/0213966 A1* | 9/2011 | Fu et al. | 713/158 |
| 2011/0246873 A1 | 10/2011 | Tolle et al. | |

(56) References Cited

U.S. PATENT DOCUMENTS

| | | | |
|---|---|---|---|
| 2011/0289074 A1 | 11/2011 | Leban | |
| 2011/0296341 A1 | 12/2011 | Koppert | |
| 2011/0296503 A1* | 12/2011 | Shull et al. | 726/5 |
| 2011/0302510 A1 | 12/2011 | Harrison et al. | |
| 2011/0314154 A1* | 12/2011 | Resch et al. | 709/225 |
| 2011/0321139 A1* | 12/2011 | Jayaraman et al. | 726/4 |
| 2012/0030460 A1* | 2/2012 | Chang | 713/156 |
| 2012/0054869 A1* | 3/2012 | Yen et al. | 726/24 |
| 2012/0066502 A1* | 3/2012 | Borneman et al. | 713/176 |
| 2012/0072821 A1 | 3/2012 | Bowling | |
| 2012/0079584 A1* | 3/2012 | Niemela | 726/10 |
| 2012/0084644 A1 | 4/2012 | Robert et al. | |
| 2012/0096365 A1 | 4/2012 | Wilkinson et al. | |
| 2012/0110017 A1 | 5/2012 | Gu et al. | |
| 2012/0117649 A1* | 5/2012 | Holloway et al. | 726/24 |
| 2012/0137201 A1 | 5/2012 | White et al. | |
| 2012/0143944 A1 | 6/2012 | Reeves et al. | |
| 2012/0150844 A1 | 6/2012 | Lindahl et al. | |
| 2012/0166922 A1 | 6/2012 | Rolles | |
| 2012/0179907 A1* | 7/2012 | Byrd | H04L 9/3268 713/156 |
| 2012/0198516 A1 | 8/2012 | Lim | |
| 2012/0203904 A1* | 8/2012 | Niemela et al. | 709/225 |
| 2012/0215834 A1 | 8/2012 | Chen et al. | |
| 2012/0215919 A1 | 8/2012 | Labat et al. | |
| 2012/0216035 A1* | 8/2012 | Leggette et al. | 713/157 |
| 2012/0284629 A1 | 11/2012 | Peters et al. | |
| 2012/0317295 A1 | 12/2012 | Baird et al. | |
| 2012/0331406 A1 | 12/2012 | Baird et al. | |
| 2013/0007101 A1 | 1/2013 | Trahan et al. | |
| 2013/0007102 A1 | 1/2013 | Trahan et al. | |
| 2013/0031461 A1 | 1/2013 | Hou et al. | |
| 2013/0080611 A1 | 3/2013 | Li et al. | |
| 2013/0198823 A1* | 8/2013 | Hitchcock et al. | 726/6 |
| 2013/0318354 A1* | 11/2013 | Entschew et al. | 713/175 |

OTHER PUBLICATIONS

Mockapetris, "Domain Names—Implementation and Specification", RFC 1035, 1987.*
Merriam-Webster, "likelihood", 2015.*
Merriam-Webster, "probability", 2015.*
Merriam-Webster, "assume", 2015.*
Dierks et al., "The TLS Protocol Verion 1.0", RFC 2246, 1999.*
Vixie et al., "Dynamic Updates in the Domain Name System (DNS Update)", RFC 2136, 1997.*
Cooper et al., "Internet X.509 Public Key Infrastructure Certificate and Certificate Revocation List (CRL) Profile", RFC 5280, 2008.*
Breebaart et al., "A Reference Architecture for Biometric Template Protection based on Pseudo Identities", 2008.*
Bajari et al., "Economic Insights from Internet Auctions", 2004.*
Jackson, "Certificates and Reports", 1926.*
de Carvalho et al., "Synchronizing Web Browsing Data with Browser", 2010.*
Almuhimedi et al., "Toward Web Browsers that Make or Break Trust a Usability Evaluation of Certificate Management in Mozilla Firefox 3", 2008.*
Igoe et al., "X.509v3 Certificates for Secure Shell Authentication", RFC 6187, 2011.*
Chen, H., et al., "Bringing Order to the Web: Automatically Categorizing Search Results," Proceedings of the SIGCHI Conference on Human Factors in Computing Systems, Apr. 1-6, 2000, pp. 145-152.
Rao, H.C.-H.,et al., "A Proxy-Based Personal Web Archiving Service," Operating Systems Review, 35(1):61-72, 2001.
Teevan, J., et al., "Changing How People View Changes on the Web," 2009, Proceedings of the $22^{nd}$ Annual ACM Symposium on User Interface Software and Technology, New York, 2009, pp. 237-246.
Baumann, A., et al., Enhancing STEM Classes Using Weave: A Collaborative Web-Based Visualization Environment, Integrated Stem Education Conference, Apr. 2, 2011, Ewing, New Jersey, pp. 2A-1-2A-4.
De Carvalho, L.G., et al., Synchronizing Web Browsing Data With Browserver, Proceedings of the IEEE Symposium on Computers and Communications, Jun. 22-25, 2010, Riccione, Italy, pp. 738-743.
Close 'n' Forget Firefox add on, Evilfantasy's blog, http://evilfantasy.wordpress.com/2009/03/24/close-%E2%80%98n%E2%80%99-forget-firefox-add-on/, retrieved Mar. 24, 2009, 1 page.
Bango, Rey "How JS & Ajax work in Opera Mini 4", Nov. 2, 2007, XP055050107, Retrieved from the Internet.
Brinkmann, M, "Record and Share your browser history with Hooeey," ghacks.net, Feb. 26, 2008, 6 pages, printed on Jan. 25, 2013.
Considine, A, "The Footprints of Web Feet," The New York Times, Mar. 4, 2011, 3 pages, printed on Jan. 25, 2013.
EyeBrowse: Record, Visualize and Share your Browser History, Information Aesthetics, Sep. 18, 2009, 2 pages, printed on Jan. 25, 2013.
Feuerstein, Adam, "Flyswat Takes Aim," San Francisco Business Times, printed from http://www.bizjournals.com/sanfrancisco/stories/1999/10/25/story2.html?t=printable, Oct. 22, 1999, 2 pages.
Gabber et al., "How to Make Personalized Web Browsing Simple, Secure, and Anonymous," Financial Cryptography, 16 pages (1997).
Gingerich, Jason, "Keycorp Making Site Into Portal," KRTBN Knight-Ridder Tribune Business News (South Bend Tribune, Indiana), Oct. 25, 1999, 2 pages.
Hopper, D. Ian, "Desktops Now Have Power to Comparison-Shop," Oct. 18, 1999, printed from http://www.cnn.com/TECH/computing/9910/18/r.u.sure/index.html, 3 pages.
Van Kleek, M, Introducing "Eyebrowse"—Track and share your web browsing in real time, Haystack Blog, Aug. 28, 2009, 3 pages, printed on Jan. 25, 2013.
Web page titled "RSS Ticker: Add-ons for Firefox," https://addons.mozilla.org/en-US/firefox/addon/rss-ticker/, 3 printed pages, printed on Feb. 7, 2013.
Web page titled "What Internet Users Do on a Typical Day, Trend Data (Adults), Pew Internet & American Life Project," printed from http://pewinternet.org/Static-Pages/Trend-Data-(Adults)/Online-Activities-Daily.aspx on Nov. 29, 2012, 4 pages.

\* cited by examiner

REMOTE BROWSING SESSION MANAGEMENT

BACKGROUND

Generally described, computing devices and communication networks can be utilized to exchange information. In a common application, a computing device can request content from another computing device via the communication network. For example, a user at a personal computing device can utilize a software browser application, typically referred to as a browser software application, to request a Web page from a server computing device via the Internet. In such embodiments, the user computing device can be referred to as a client computing device and the server computing device can be referred to as a content provider.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices, such as a browser software application, typically processes embedded resource identifiers to generate requests for the content. Accordingly, in order to satisfy a content request, one or more content providers will generally provide client computing devices data associated with the Web page as well as the data associated with the embedded resources.

Once the client computing device obtains the Web page and associated additional resources, the content may be processed in a number of stages by the software browser application or other client computing device interface. For example, and with reference to the above illustration, the software browser application may parse the Web page to process various HTML layout information and references to associated resources, may identify and process Cascading Style Sheets ("CSS") information, may process and instantiate various Javascript code associated with the Web page, may construct a native object model to represent one or more components of the Web page, and may calculate various layout and display properties of the processed content for presentation to a user.

When a client computing device establishes a secure channel for communication with a content source, such as an SSL connection for HTTPS transmissions, the client computing device connects with a server at an IP address returned from a DNS lookup. In the case of an SSL connection, the client computing device will participate in an SSL handshake with the server, and receive a digital certificate, signed by a third party certificate authority trusted by the client computing device, identifying the server as being associated with content provider. An error or fraud in the DNS record or digital certificate can expose the information intended for a specific content source to unknown or potentially malicious third parties, even when a secure, encrypted connection is established with the server.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
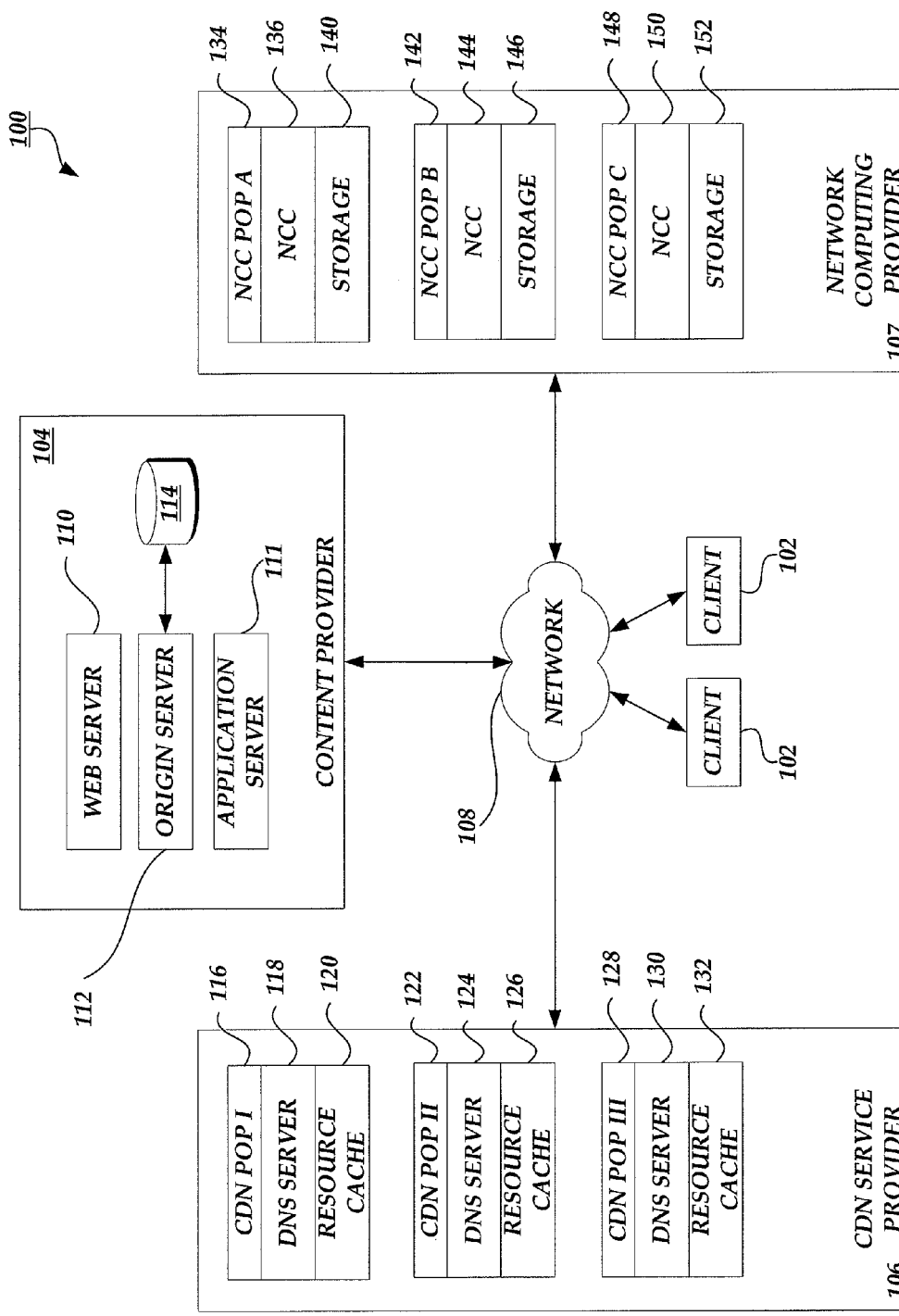
FIG. 1 is a block diagram illustrative of a content delivery environment including a number of client computing devices, content provider, a content delivery network service provider, and a network computing provider.

Generally described, the present disclosure is directed to the detection of erroneous, fraudulent, or otherwise unexpected, server identification information received by a client computing device. Specifically, aspects of the disclosure will be described with regard to receipt of a digital certificate or DNS record by a client computing device during a browsing session, transmission of some or all of the information in the digital certificate or DNS record to a network computing provider, comparison of the received information to other contemporaneous or historical information to detect unexpected, erroneous, or potentially fraudulent information, and generation of an alert if the information is detected to be erroneous or potentially fraudulent. For purposes of illustration, such information will be generally described as unexpected. Additionally, content providers and DNS providers can be provided with access to information received from client computing devices regarding digital certificates or DNS entries associated with the with content provider or DNS provider. Although aspects of the embodiments described in the disclosure will focus, for the purpose of illustration, on the processing by a network computing provider, one skilled in the art will appreciate that the techniques disclosed herein may be applied to any number of hardware or software processes or applications. Further, although various aspects of the disclosure will be described with regard to illustrative examples and embodiments, one skilled in the art will appreciate that the disclosed embodiments and examples should not be construed as limiting.

With reference to an illustrative example, a user may cause a client computing device to load a software browser application (henceforth referred to as a "browser") for accessing content provided by one or more content providers. Illustratively, the accessed content may include a collection of one or more network resources (e.g., a Web page) and embedded resources such as images, video, audio, text, executable code, and other resources. In one embodiment, the browser may have a content display area or pane for displaying the accessed network content in addition to one or more local interface components, such as toolbars, menus, buttons, or other user interface controls. Local interface components may be managed and controlled by the software browser application or any other process executing or implemented locally at the client computing device. Illustratively, managing user interface controls locally may allow for a responsive user interface, as interactions by the user are processed locally on the client computing device.

Subsequent to the browser being loaded, a user or automated browser process may cause the client computing device to transmit a request to access content from a content provider. For example, the user may select or enter a URL, (e.g., https://www.xyzwebsite.com) into a browser window, causing the client computing device to transmit a request for a domain name service (DNS) lookup to a DNS server. The client computing device can receive a response from the DNS server containing the internet protocol (IP) address of a server associated with the content provider. The client computing device can utilize the IP address to contact the server and exchange an SSL handshake with the server. During the SSL handshake, the client computing device can receive a digital certificate verifying that the server at the IP address is associated with the content provider. The digital certificate can be signed by a third-party certificate authority trusted by the client computing provider to provide such identification services.

In some cases, the security of the certificate authority can be compromised, and digital certificates can be fraudulently issued. The fraudulent certificates may identify a server as being associated with a content provider when in fact the server is not associated with the content provider at all, but rather is under the control of a malicious party. Because the certificate was fraudulently issued by the certificate authority, it may be signed by the certificate authority even though the certificate authority did not knowingly issue the certificate. Such a certificate may be trusted by the client computing device because it is signed by a trusted certificate authority. When a user of the client computing device contacts the server—with an IP address received by a fraudulent DNS lookup, a link in an email or web site, etc.—the client computing device may receive the fraudulent certificate during the SSL handshake and proceed to transmit sensitive data to the server, believing it to be associated with the content source.

In an illustrative embodiment, the client computing device can transmit digital certificates and/or DNS records to a network computing provider to detect fraudulent data. The network computing provider can verify whether the DNS record or digital certificate is authentic, and return an alert to the client computing device if it the digital certificate or DNS record is detected to be fraudulent. The network computing provider may determine whether the data is fraudulent by requesting the data from an IP address known to be associated with the content source, by comparing the data to data received from any number of other client computing devices, etc. In response to detecting a difference in the digital certificate received from the client computing device when compared to, for example, a digital certificate received by the network computing provider directly from the content source, the network computing provider may determine that the digital certificate is fraudulent or determine that there is a likelihood that the digital certificate may be fraudulent.

In an illustrative embodiment, responsive to the digital certificate or DNS record received from the client computing device, the network computing provider may instantiate or cause to have instantiated one or more computing components associated with the network computing provider that will host a browser software application. For example, the network computing provider can instantiate, or cause to have instantiated, an instance of a virtual machine that includes a software browser application capable of requesting resources from a communication network. Illustratively, in some situations, one or more devices associated with the network computing provider may be located in a data center or other robustly networked computing environment, and, as compared to the client computing device, may experience relatively little latency or delay when obtaining network resources. The software browser application or another component of the virtual network computing provider can retrieve information directly from the content source or from historical records received from other client computing devices to use in detecting fraudulent data.

FIG. 1 is a block diagram illustrative of a networked computing environment 100 for the management and processing of content requests. As illustrated in FIG. 1, the networked computing environment 100 includes a number of client computing devices 102 (generally referred to as clients) for requesting content and content processing from a content provider 104, CDN service provider 106, or network computing provider 107. In an illustrative embodiment, the client computing devices 102 can corresponds to a wide variety of computing devices including personal computing devices, laptop computing devices, hand-held computing devices, terminal computing devices, mobile devices (e.g., mobile phones, tablet computing devices, etc.), wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet. The client computing devices 102 may have varied local computing resources such as central processing units and architectures, memory, mass storage, graphics processing units, communication network availability and bandwidth, etc.

The networked computing environment 100 can also include a content provider 104 in communication with the one or more client computing devices 102 or other service providers (e.g., CDN service provider 106, network computing provider 107, etc.) via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102 or other service providers. The content provider 104 can further include an origin server component 112 and associated storage component 114 corresponding to one or more computing devices for obtaining and processing requests for network resources from the CDN service provider. The content provider 104 can still further include an application server computing device 111, such as a data streaming server, for processing streaming content requests. One skilled in the relevant art will appreciate that the content provider 104 can be associated with various additional computing resources, such as additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the networked computing environment 100 can further include a CDN service provider 106 in communication with the one or more client computing devices 102 and other service providers via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each CDN POP 116, 122, 128 includes a DNS component 118, 124, 130 made up of a number of DNS server computing devices for resolving DNS queries from the client computers 102. Each CDN POP 116, 122, 128 also includes a resource cache component 120, 126, 132 made up of a number of cache server computing devices for storing resources from content providers and transmitting various requested resources to various client computers. The DNS components 118, 124, and 130 and the resource cache components 120, 126, 132 may further include additional software and/or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the CDN POPs 116, 122, 128 are illustrated in FIG. 1 as logically associated with the CDN service provider 106, the CDN POPs will be geographically distributed throughout the communication network 108 in a manner to best serve various demographics of client computing devices 102. Additionally, one skilled in the relevant art will appreciate that the CDN service provider 106 can be associated with various additional computing resources, such as additional computing devices for administration of content and resources, and the like.

With further continued reference to FIG. 1, the networked computing environment 100 can also include a network computing provider 107 in communication with the one or more client computing devices 102, the CDN service provider 106, and the content provider 104 via the communication network 108. The network computing provider 107 illustrated in FIG. 1 also corresponds to a logical association of one or more computing devices associated with a network computing provider. Specifically, the network computing provider 107 can include a number of Point of Presence ("POP") locations 134, 142, 148 that correspond to nodes on the communication network 108. Each POP 134, 142, 148 includes a network computing component (NCC) 136, 144, 150 for hosting applications, such as data streaming applications, via a number of instances of a virtual machine, generally referred to as an instance of an NCC. One skilled in the relevant art will appreciate that NCC 136, 144, 150 would include physical computing device resources and software to provide the multiple instances of a virtual machine or to dynamically cause the creation of instances of a virtual machine. Such creation can be based on a specific request, such as from a client computing device, or the NCC can initiate dynamic creation of an instance of a virtual machine on its own. Each NCC POP 134, 142, 148 also includes a storage component 140, 146, 152 made up of a number of storage devices for storing any type of data used in the delivery and processing of network or computing resources, including but not limited to user data, state information, processing requirements, historical usage data, and resources from content providers that will be processed by an instance of an NCC 136, 144, 150 and transmitted to various client computers, etc. The NCCs 136, 144, 150 and the storage components 140, 146, 152 may further include additional software and/or hardware components that facilitate communications including, but not limited to, load balancing or load sharing software/hardware components for selecting instances of a virtual machine supporting a requested application and/or providing information to a DNS nameserver to facilitate request routing.

In an illustrative embodiment, NCCs 136, 144, 150 and the storage components 140, 146, 152 are considered to be logically grouped, regardless of whether the components, or portions of the components, are physically separate. For example, a network computing provider 107 may maintain separate POPs for providing the NCC and the storage components. Additionally, although the NCC POPs 134, 142, 148 are illustrated in FIG. 1 as logically associated with a network computing provider 107, the NCC POPs will be geographically distributed throughout the communication network 108 in a manner to best serve various demographics of client computing devices 102. Additionally, one skilled in the relevant art will appreciate that the network computing provider 107 can be associated with various additional computing resources, such additional computing devices for administration of content and resources, and the like. Even further, one skilled in the relevant art will appreciate that the components of the network computing provider 107 and components of the CDN service provider 106 can be managed by the same or different entities.

With reference now to FIGS. 2-6, the interaction between various components of the networked computing environment 100 of FIG. 1 will be illustrated. Specifically, FIGS. 2A, 3A, 4A, 5A, and 6A (FIGS. 2A-6A) illustrate the interaction between various components of the networked computing environment 100 for the exchange of content between a client computing device 102 and a content provider 104 via the network computing provider 107. FIGS. 2B, 3B, 4B, 5B, and 6B (FIGS. 2B-6B) illustrate the additional exchanges which can occur when a client computing device 102 utilizes a secure protocol, such as HTTPS, to request a network resource from a content provider 104 and submits identification data received from the content provider 104 to a network computing provider 107 to detect unexpected certificates or DNS records. When the client computing device 102 utilized HTTPS to contact content providers, the interactions illustrated in FIGS. 2B-6B typically execute before the corresponding interactions in FIGS. 2A-6A, although other ordering is possible. When the client computing device 102 does not utilize HTTPS, the interactions illustrated in FIGS. 2B-6B may execute only for DNS entries, or may not execute at all. For purposes of the example, the illustrations have been simplified such that many of the components utilized to facilitate communications are not shown. One skilled in the relevant art will appreciate that such components can be utilized and that additional interactions would accordingly occur without departing from the spirit and scope of the present disclosure.

Figure 2A:
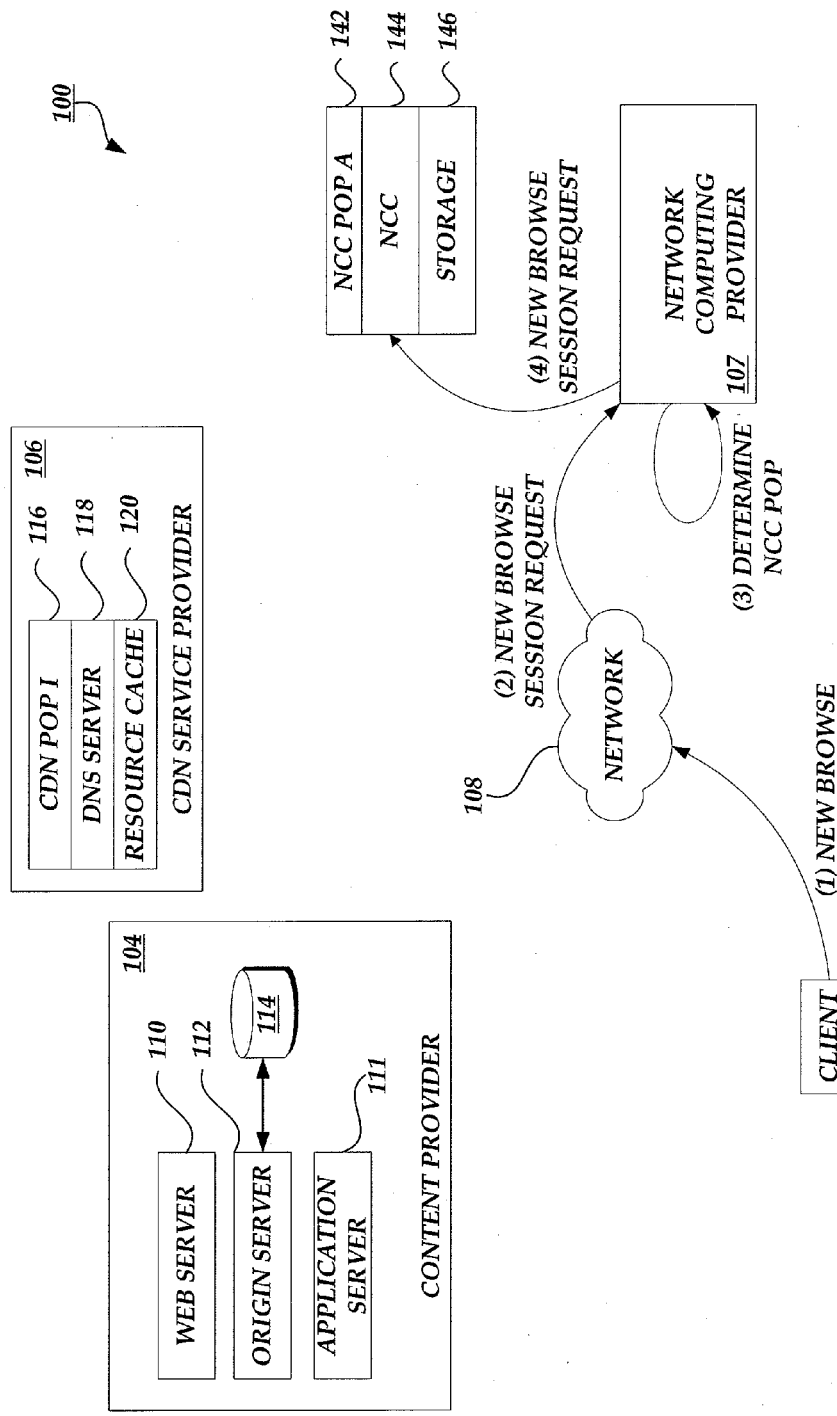
FIG. 2A is a block diagram of the content delivery environment of FIG. 1 illustrating the generation and processing of a new browse session request from a client computing device to a network computing provider.

With reference to FIG. 2A, the process can begin with the generation and processing of a browse session request from a client computing device 102 to a network computing provider 107 will be described. Illustratively, the client computing device 102 may load a browser for viewing network content in response to an event or user request. Subsequent to the browser being loaded, the browser may be implemented to request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. As illustrated in FIG. 2A, the browse session request is transmitted first to a network computing provider 107. In an illustrative embodiment, the network computing provider 107 utilizes a registration application program interface ("API") to accept browse session requests from the client computing device 102. The browse session request can include network address information corresponding to a requested network resource, which may be in any form, including, but not limited to, an Internet Protocol ("IP") address, a URL, a Media Access Control ("MAC") address, etc.

Figure 2B:
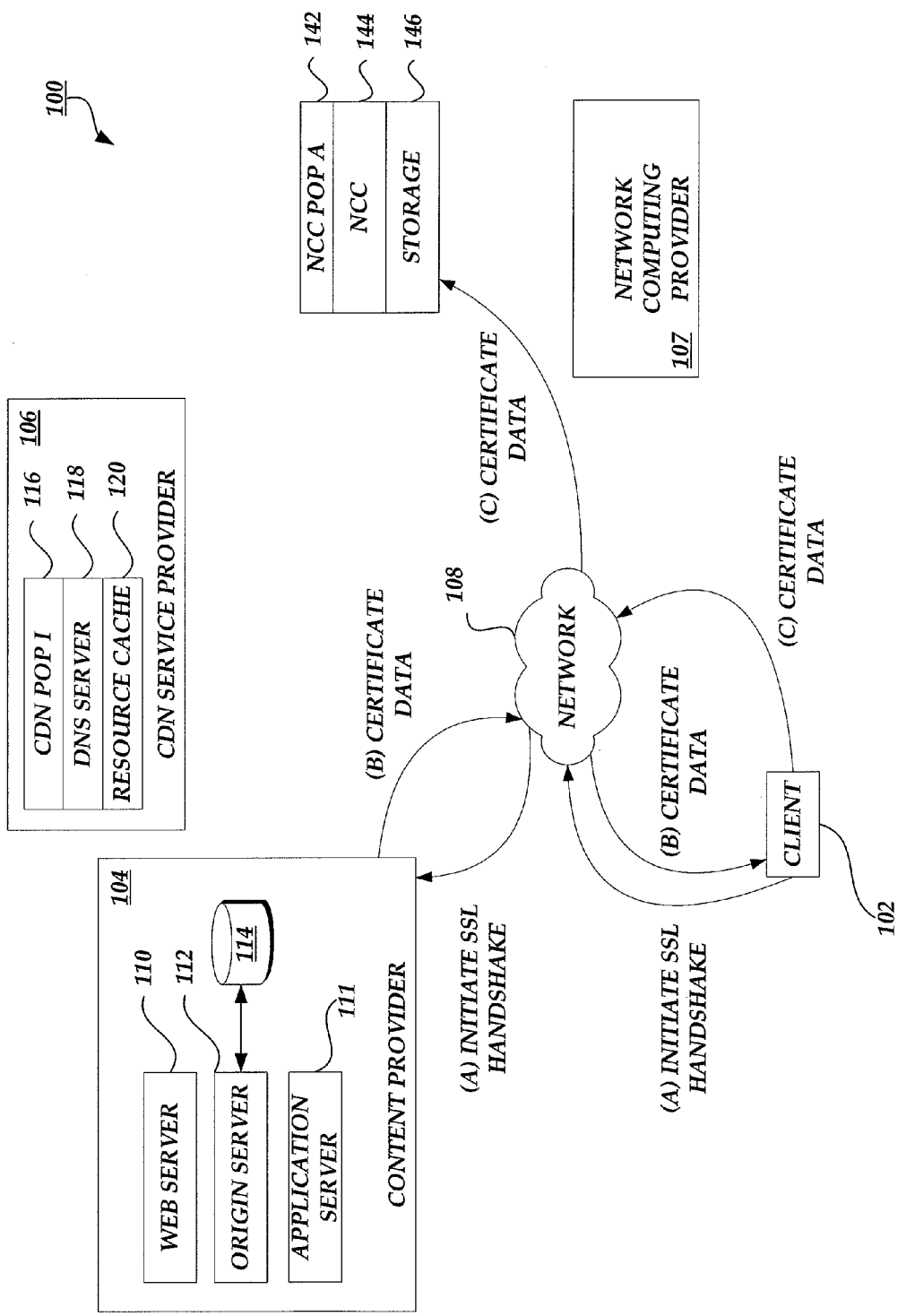
FIG. 2B is a block diagram of the content delivery environment of FIG. 1 illustrating an SSL handshake that occurs between a client computing device and a network computing provider.

Subsequent to the receipt of the browse session request, the network computing provider 107 may select an associated network computing component (hereinafter "NCC") point of presence (hereinafter "POP") such as NCC POP 142 to service the browse session request. The selection of the NCC POP may determine the processing and network resources available to the instantiated virtual machine. The selection of processing and network resources and the provisioning of software at the NCC POP instance may be done, at least in part, in order to optimize communication with content providers 104 and client computing devices 102. As illustrated in FIG. 2B, the identification data received with the browse session request can be passed to the NCC POP instance servicing the browse session request.

With reference to FIG. 2B, an SSL handshake between the client computing device 102 and a content provider 104 will be described. Before a client computing device 102 can transmit an HTTPS request or other secure communication, an SSL handshake procedure, known in the art, is performed first. For example, if a user of the client computing device 102 wishes to request a network resource from the content provider 104 over a secure HTTPS connection, an SSL handshake procedure (A), as illustrated in FIG. 2B, is performed first. The SSL handshake can occur directly between the content provider 104 and the client computing device 102, as illustrated in FIG. 2B, rather than through the network computing provider 107. During the SSL handshake, certificate data (B) can be transmitted to the client computing device 102. The certificate data can include a digital certificate identify the server as being associated with content provider 104 that the client computing device 102 wished to access. The client computing device 102 can transmit the certificate data (C) to an NCC POP 142 of a network computing provider 107 for detection of unexpected certificate data.

In some embodiments, alternative protocols are utilized to establish a secure connection between the client computing device 102 and the content provider 104. In some embodiments, there is not secure connection between the content provider 104 and the client computing device 102. In such cases, a DNS lookup can be requested by the client computing device 102 prior to contacting the content provider 104. The DNS lookup can return an IP address of the content provider 104. In some embodiments, a DNS lookup is performed prior to the SSL handshake illustrated in FIG. 2B.

Figure 3A:
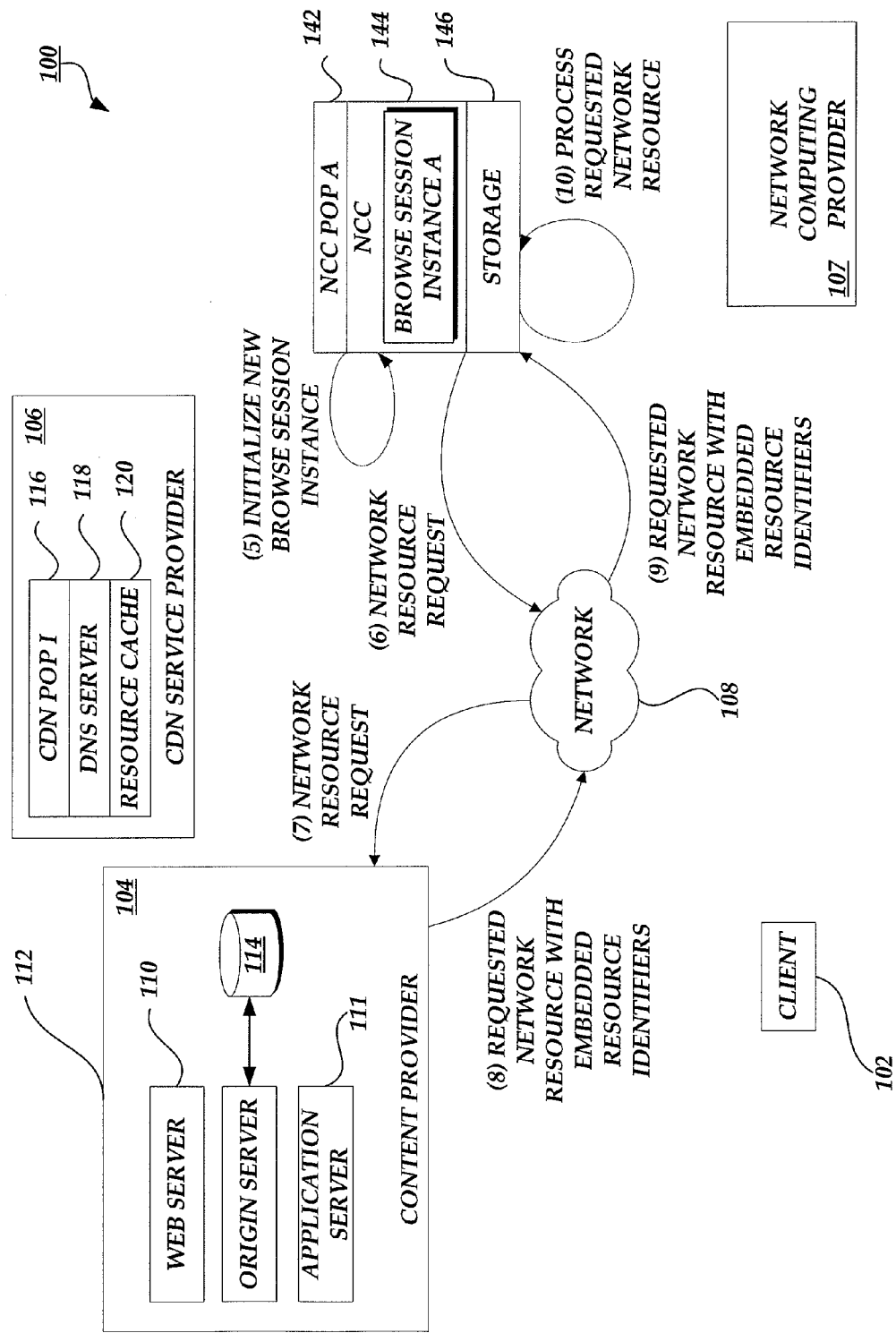
FIG. 3A is a block diagram of the content delivery environment of FIG. 1 illustrating the generation and processing of a request for a network resource from a network computing provider to a content provider.

With reference to FIG. 3A, an illustrative interaction for generation and processing of a request for a network resource from a network computing provider 107 to a content provider 104 will be described. As illustrated in FIG. 3A, the selected NCC POP 142 may generate a browse session corresponding to one or more content providers based on a browse session request, such as the illustrative browse session request depicted in FIG. 2A above. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session.

Subsequent to initializing a new browse session instance, NCC POP 142 may provide a request for a network resource to a content provider 104 based on a network address included in the browse session request. For example, a browse session request may include a URL for a Web page, such as "http://www.xyzsite.com/default.htm." NCC POP 142 may resolve the URL to an IP address through a DNS resolver associated with the network computing provider (not shown), and may request the Web page from the content provider 104 at the resolved IP address. In various embodiments, a network resource may be retrieved from any combination of content providers, content delivery network (hereinafter "CDN") servers, or caches associated with the network computing provider 107. For example, the network computing provider may check if a resource is stored in a local cache or in another server or service provider associated with the network computing provider 107. If a network resource is stored in a local or associated location, the NCC POP 142 may retrieve the network resource from the local or associated location rather than from the third party content provider 104 or CDN service provider 106. Illustratively, the NCC POP 142 may provide requests for any number of network resources as included in the browse session request, and may obtain these network resources from any number of different sources, sequentially or in parallel.

As illustrated in FIG. 3A, the content provider 104 receives the resource request from the NCC POP 142 and processes the request accordingly. In one embodiment, the content provider 104 processes the resource request as if it were originally provided by the client computing device 102. For example, the content provider 104 may select the type of content, ordering of content, or version of content according to the requirements of the requesting client computing device 102. In another embodiment, the content provider 104 may be provided with information that provides information associated with the NCC POP 142 for utilization in providing the requested content (e.g., an available amount of processing resources or network bandwidth).

Subsequent to obtaining the requested network resource from the content provider 104 (or other source designated by the content provider), the NCC POP 142 may process the network resource to extract embedded resource identifiers and gather information for determination of a remote session browsing configuration. For example, a network resource such as a Web page may include embedded CSS style information and Javascript as well as embedded resource identifiers to additional resources such as text, images, video, audio, animation, executable code, and other HTML, CSS, and Javascript files. In the process of extracting the embedded resource identifiers, the NCC POP 142 may gather information about the processed network resources for later use in the determination of a remote session browsing configuration as discussed below with reference to FIG. 4A.

Figure 3B:
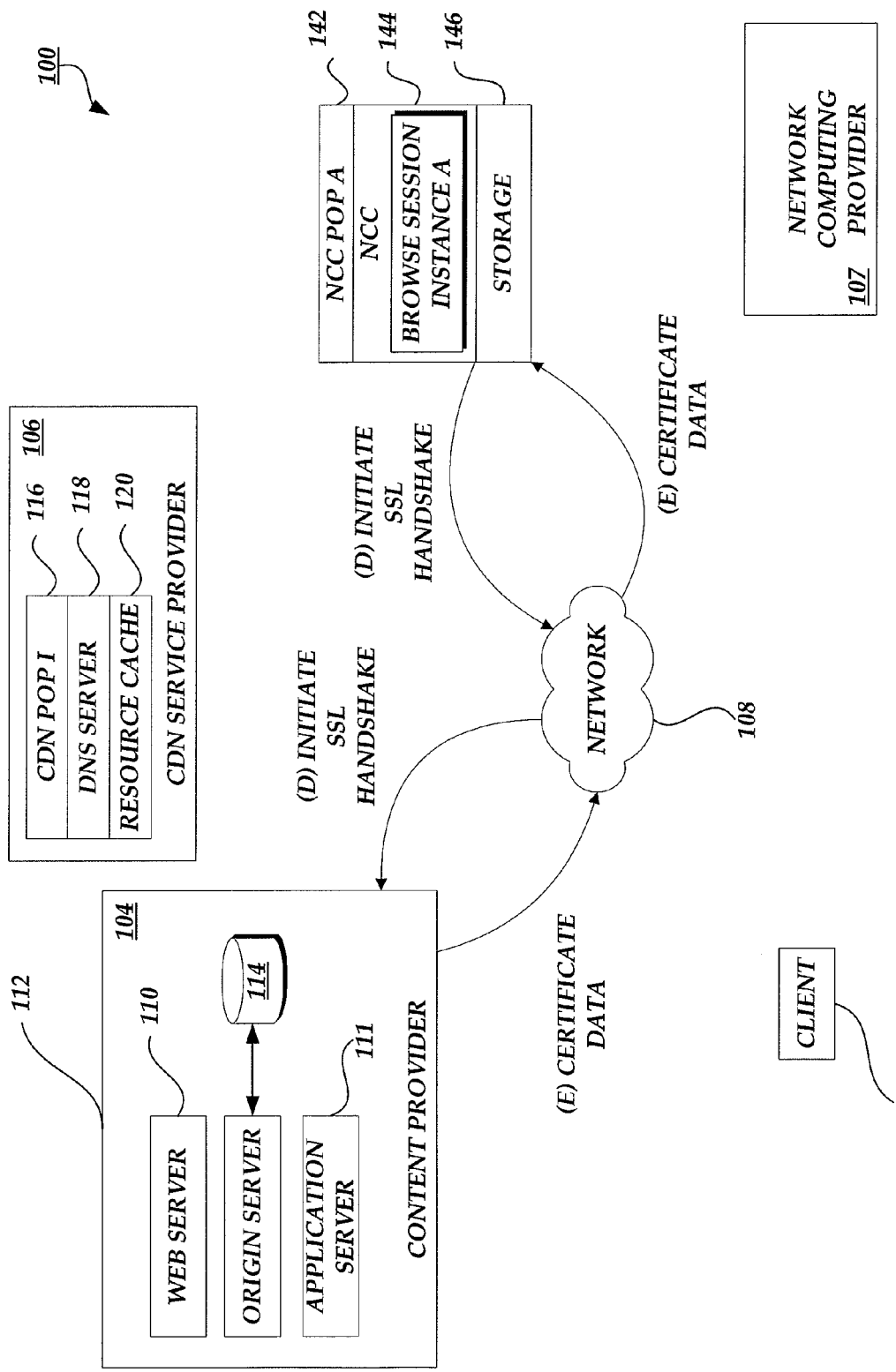
FIG. 3B is a block diagram of the content delivery environment of FIG. 1 illustrating an SSL handshake that occurs between a network computing provider and a content provider.

With reference to FIG. 3B, the SSL handshake procedure between the network computing provider 107 and the content provider 104 will be described. In response to receiving certificate data from a client computing device 102, the network computing provider 107 can transmit an HTTPS request or other secure communication to the same content provider 104, and an SSL handshake procedure (D), known in the art, can be performed. During the SSL handshake, certificate data (E) can be transmitted to the network computing provider 107. In some embodiments, a DNS lookup to determine the IP address of the content provider 104 is performed instead of, or in addition to, the SSL handshake. In some embodiments, no separate request or lookup is initiated by the network computing provider 107. In such cases, historical certificate data and/or DNS records, received from client computing devices 102 at previous times, can be loaded for processing. In some embodiments, historical data or DNS records are loaded in additional to retrieving data from the content provider 104 or a DNS server.

Figure 4A:
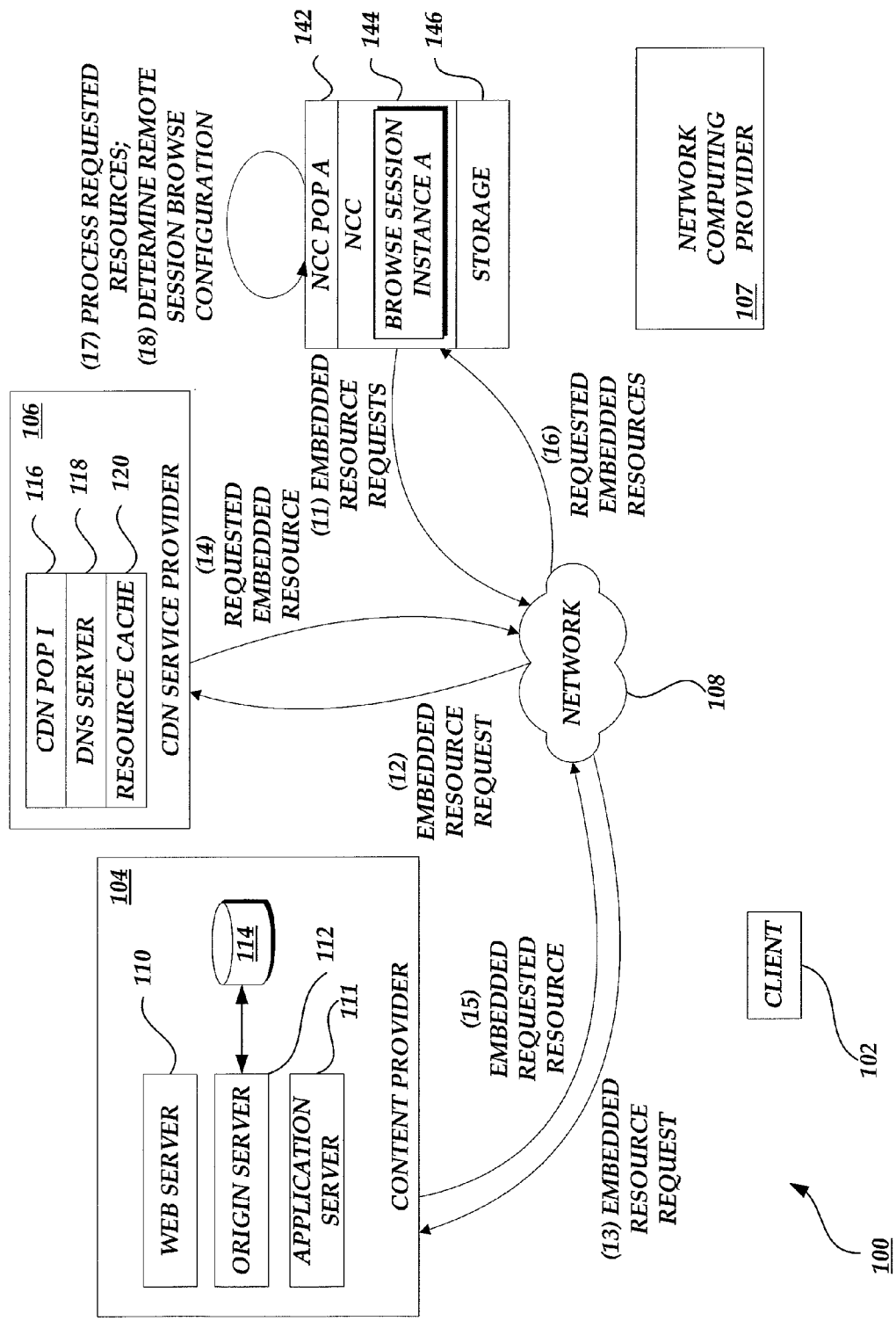
FIG. 4A is a block diagram of the content delivery environment of FIG. 1 illustrating the generation and processing of one or more requests corresponding to one or more embedded resources from a network computing provider to a content provider and content delivery network.

With reference to FIG. 4A, an illustrative interaction for generation and processing of one or more requests corresponding to one or more embedded resources from a network computing provider to a content provider and content delivery network is disclosed. As illustrated in FIG. 4A, the selected NCC POP 142 may provide resource requests to one or more sources of content such as content provider 104 and CDN POP 116. The resource requests may correspond to embedded resources based on one or more embedded resource identifiers extracted from a requested network resource (e.g., a Web page) as described in FIG. 3A above. In various embodiments, embedded resources may be retrieved from any combination of content providers, CDN servers, or caches associated with the network computing provider 107. For example, the network computing provider may check if an embedded resource is stored in a local cache or in another server or service provider associated with the network computing provider 107. If an embedded resource is stored in a local or associated location, the NCC POP 142 may retrieve the embedded resource from the local or associated location rather than the third party content provider or CDN. Illustratively, the NCC POP 142 may provide requests for any number of embedded resources referenced by a network resource, and may obtain these embedded resources from any number of different sources, sequentially or in parallel. Subsequent to obtaining the requested resources, the NCC POP 142 may process the resources and requested content to determine a remote session browsing configuration for the processing and communication of content to the client computing device 102.

Figure 4B:
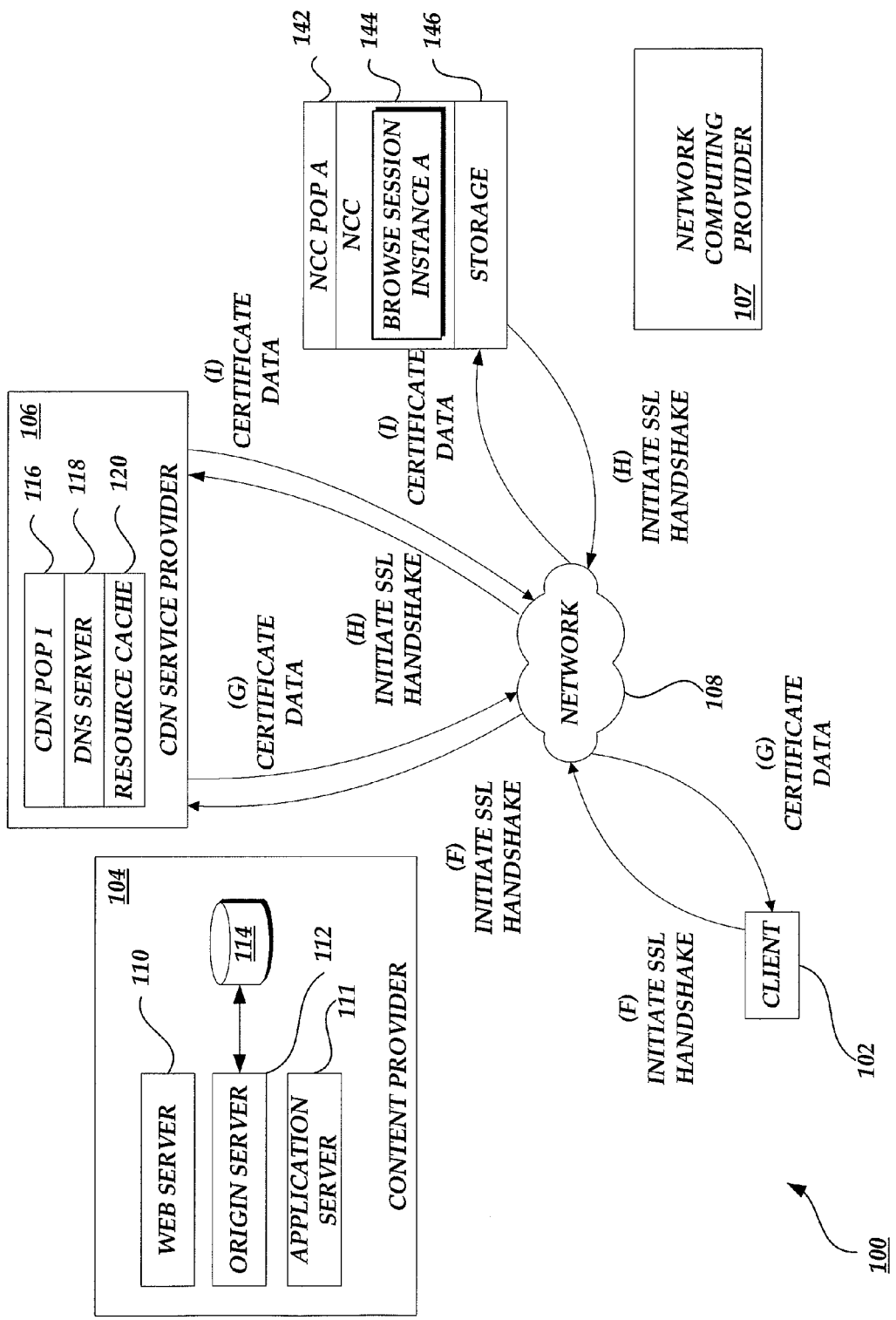
FIG. 4B is a block diagram of the content delivery environment of FIG. 1 illustrating an SSL handshake that occurs between a client computing device, a network computing provider, and a source of embedded network resources.

With reference to FIG. 4B, the SSL handshake procedure between the client computing device 102 and the CDN service provider 106, and between the network computing provider 107 and the CDN service provider 106, will be described. Before a network computing provider 107 or client computing device 102 can transmit an HTTPS request or other secure communication to a CDN service provider 106, an SSL handshake procedure, known in the art, is performed first. For example, if the embedded resource request (14), as illustrated in FIG. 4A, is to be made over a secure HTTPS connection, an SSL handshake procedure (C), as illustrated in FIG. 4B, is performed first. As described above with respect to FIGS. 2B and 3B, alternative methods and protocols can be used to establish a secure connection between the client computing device 102 or the network computing provider 180 and the CDN service provider 106. Additionally, as described above with respect to FIGS. 2B and 3B, DNS lookups can be performed in conjunction with, or instead of, the SSL handshake procedures illustrated in FIG. 4B when a client computing device 102 or network computing provider 107 is preparing to request a network resource from a CDN service provider 106.

Figure 5A:
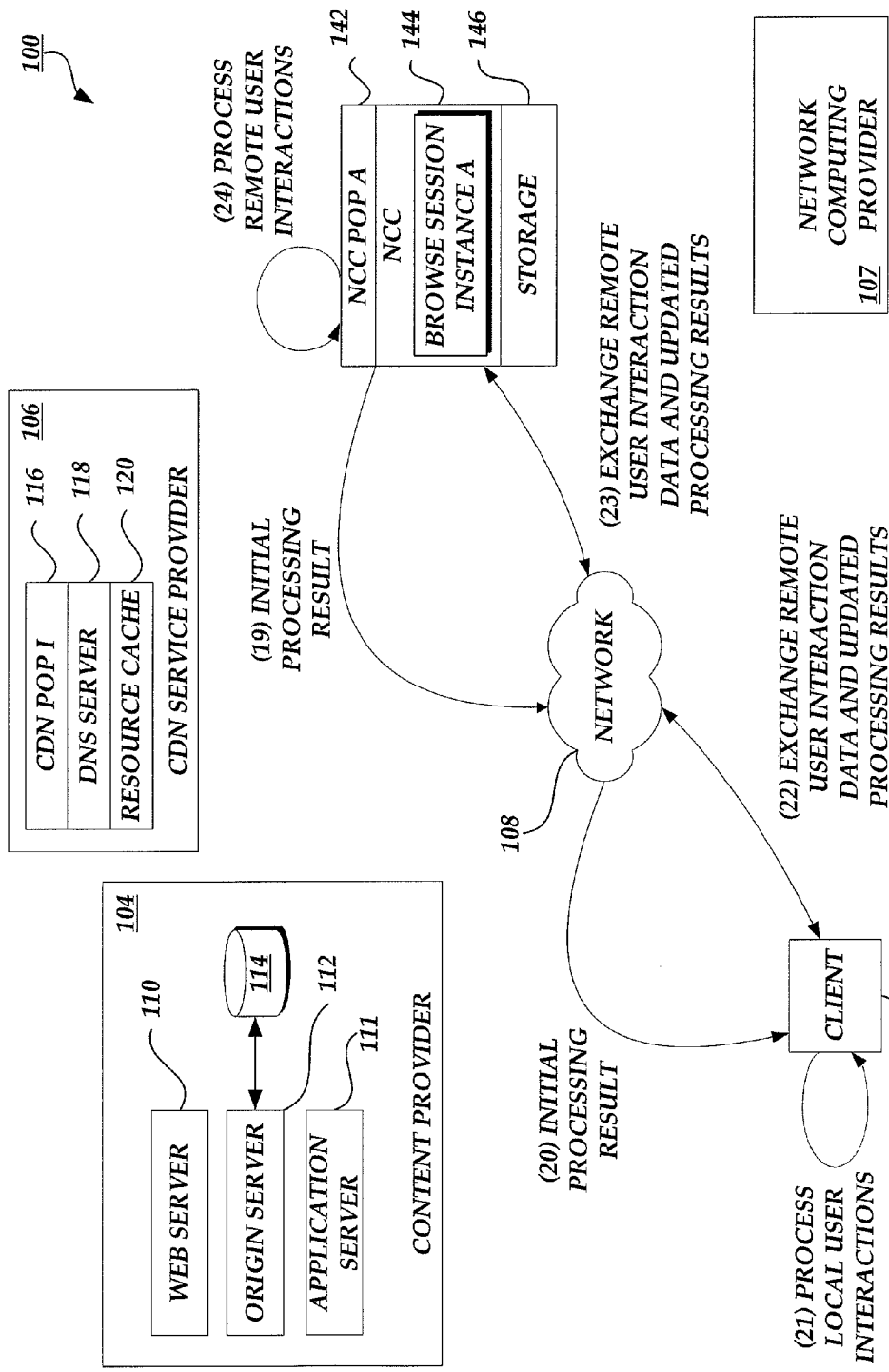
FIG. 5A is a block diagram of the content delivery environment of FIG. 1 illustrating the generation and processing of browse session data and user interaction data between a network computing provider and client computing device.
Figure 5B:
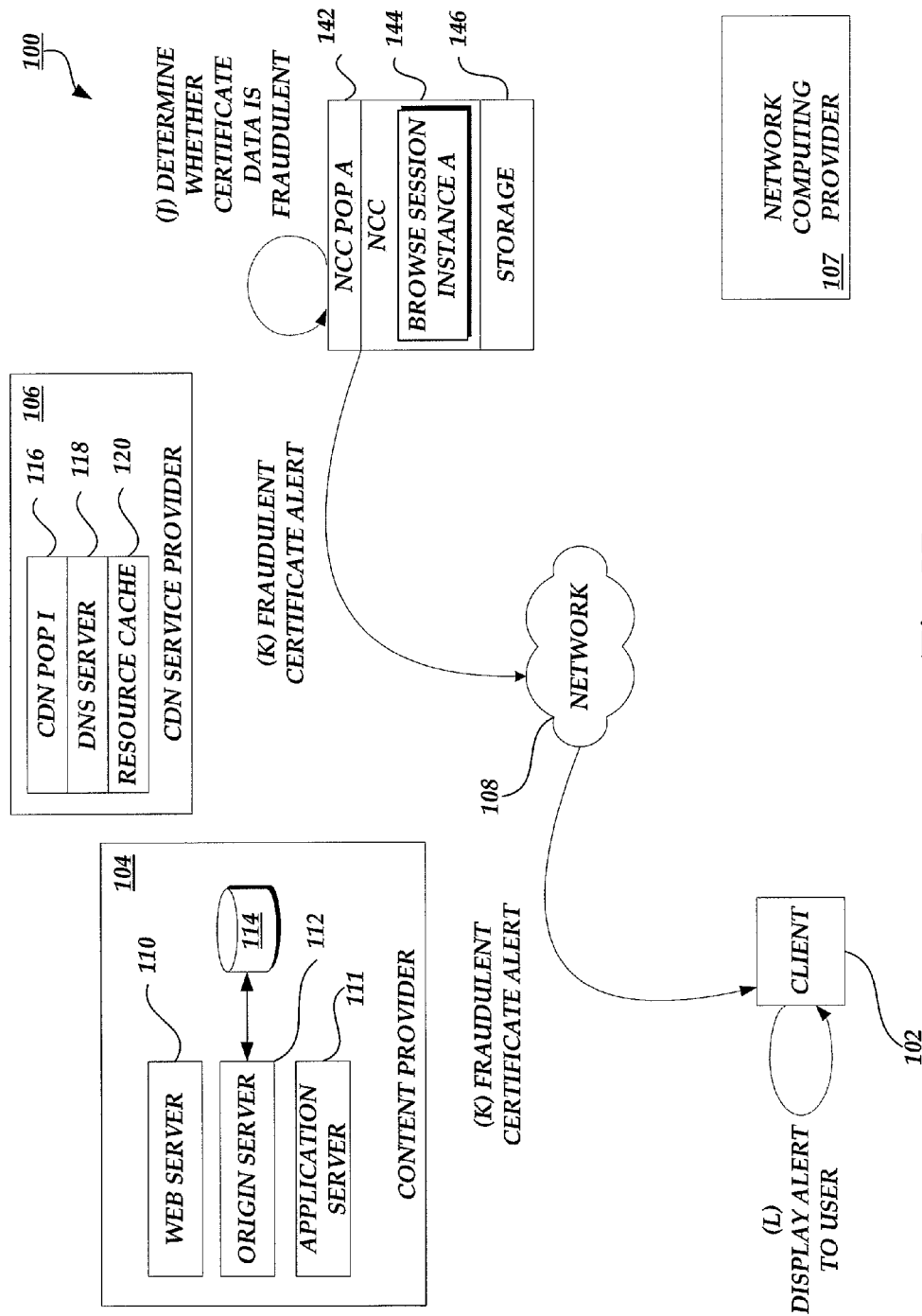
FIG. 5B is a block diagram of the content delivery environment of FIG. 1 illustrating the processing of certificate data and the transmission of an alert from a network computing provider to a client computing device.

With reference to FIG. 5A, an illustrative interaction for generation and processing of processing results and user interaction data between a network computing provider and client computing device is disclosed. As previously described, in one embodiment, the respective browsers on the instantiated network computing component and the client computing device 102 can exchange browsers' session information related to the allocation and processing of the requested resources at the instantiated network computing component and client computing device. As illustrated in FIG. 5A, the selected NCC POP 142 may provide an initial processing result to the client computing device 102 over the network 108. The initial processing result may correspond to requested network content, such as a Web page, along with associated embedded resources processed by the NCC POP 142 in accordance with a selected remote session browsing configuration as described in FIG. 4A above. As illustrated in FIG. 5B, the initial processing result can be substantially free of identification information transmitted from the content provider 104, such as cookies and the like.

The NCC POP 142 also makes a determination of which additional processes will be conducted at the NCC POP 142, at the client computing device 102, or both, as illustrated in FIG. 5A. Subsequent to receiving an initial processing result and the allocation of processes, the client computing device 102 may perform any remaining processing actions on the initial processing result as required by the selected remote session browsing configuration, and may display the fully processed content in a content display area of a browser. The client computing device 102 may process any local user interactions with local interface components or content elements locally, and may provide user interactions requiring remote processing to the network computing provider 107. The network computing provider 107 may provide updated processing results to the client computing device 102 in response to changes to the content or remote user interaction data from the client computing device 102.

With reference to FIG. 5B, the processing of certificate data and the transmission of an alert to a client computing device 102 when an unexpected digital certificate is detected will be described. In response to receiving the transmissions illustrated in, and described with respect to, FIGS. 2B, 3B, and 4B, the network computing provider 107 can process the information received in the transmissions. The network computing provider 107 can determine whether the certificate data received from the client computing device 102 is unexpected, as described in detail below. For example, the network computing provider 107 can determine that certificate data received from the client computing device 102 is different than the certificate that the network computing provider 107 received directly from the content provider 104. Based on the observed difference, the network computing provider 107 can calculate a probability that the certificate data received from the client computing device 102 is fraudulent. If the probability exceeds a threshold, for example if the probability is greater than a predetermined or dynamically determined threshold of 50%, the network computing provider 107 can generate and transmit an alert to the client computing device 102. In some embodiments, the network computing provider 107 can generate an alert to the content provider 104 instead of, or in addition to, the client computing device 102. In some embodiments, the network computing provider 107 can store the data received from the client computing device 102, the data to be used in future processing or to be provided to content providers 104, as illustrated in FIG. 6B, below.

Figure 6A:
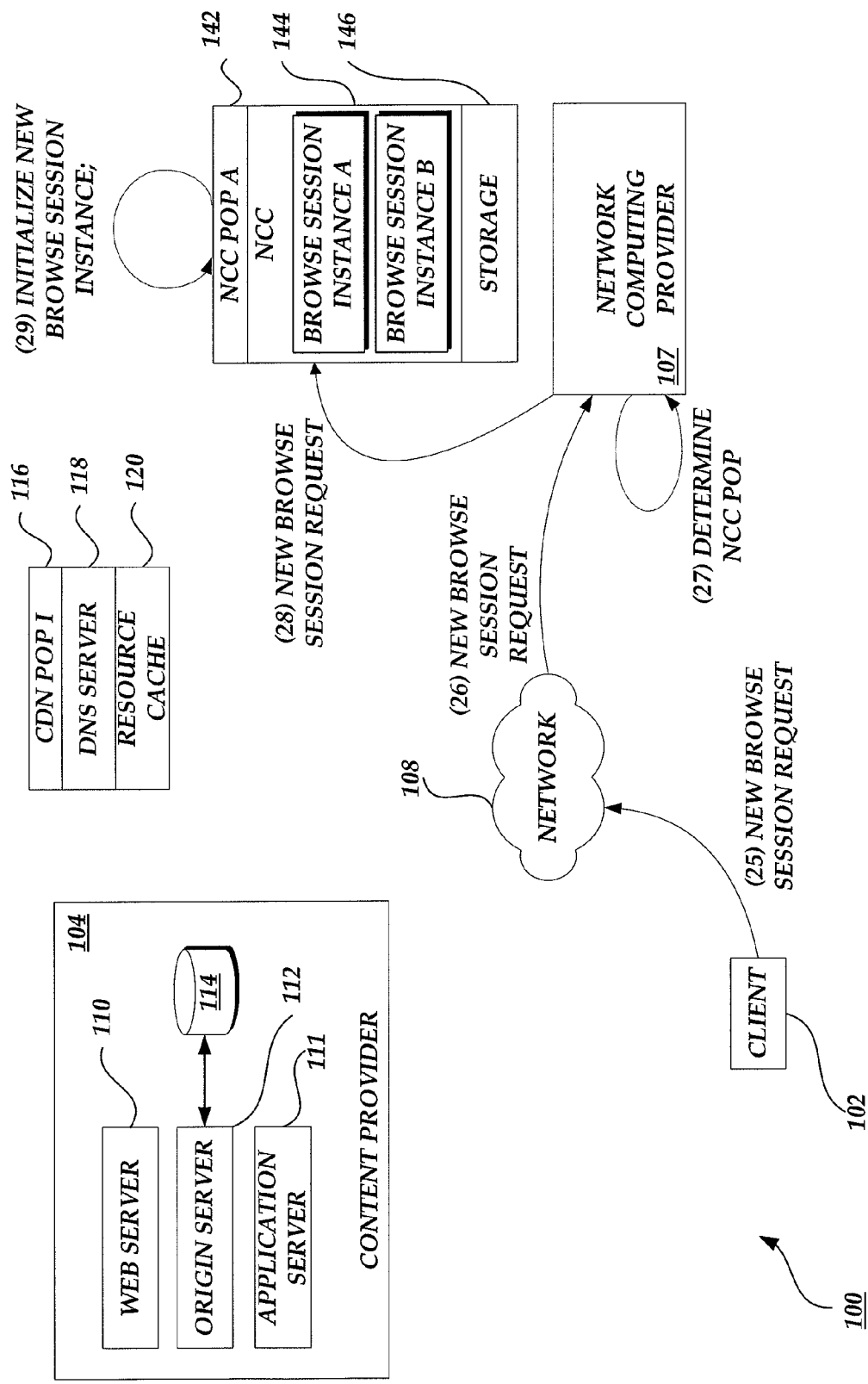
FIG. 6A is a block diagram of the content delivery environment of FIG. 1 illustrating the generation and processing of an additional new browse session request from a client computing device to a network computing provider.
Figure 6B:
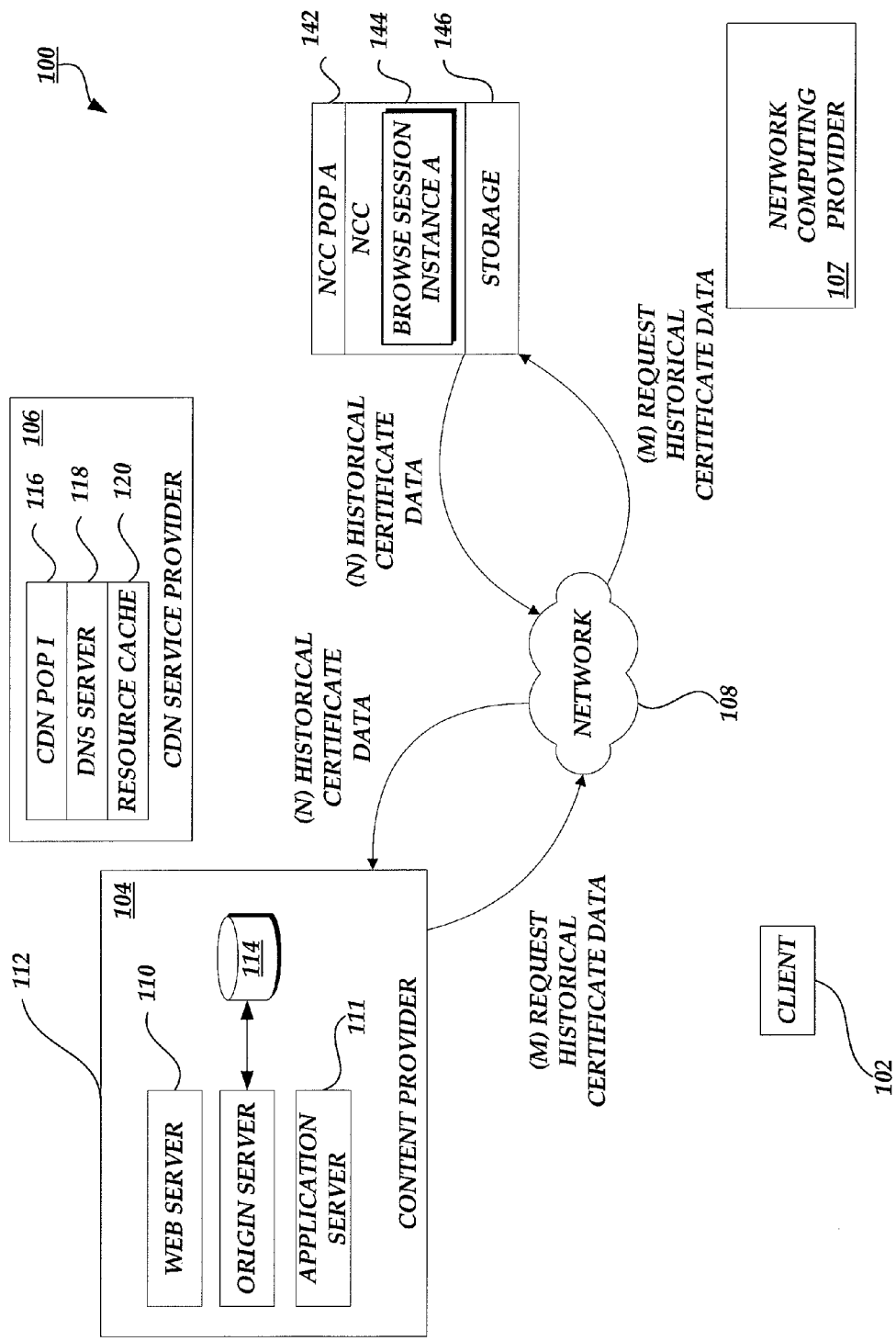
FIG. 6B is a block diagram of the content delivery environment of FIG. 1 illustrating a request, from a content provider to a network computing provider, for historical certificate data, and the processing and response to the request.

With reference to FIG. 6A, a block diagram of the content delivery environment of FIG. 1 illustrating the generation and processing of an additional new browse session request from a client computing device to a network computing provider is disclosed. As illustrated in FIG. 6A, a second new browse session request may be sent to network computing provider 107 from client computing device 102 across network 108. In an illustrative embodiment, the network computing provider 107 utilizes a registration API to accept browse session requests from the client computing device 102.

The additional browse session request may be generated by a client computing device 102 in response to a user opening up a new browser window with a new content display area, opening a new content display area in an existing browser window (e.g., opening a new tab in a browser), requesting new network content in an existing content display area (e.g., following a link to a new network resource, or entering a new network address into the browser), or any other user interaction. For example, a user browsing a first Web page corresponding to a first browse session instance may follow a link that opens a new tab or browser window to view a second Web page. In one embodiment, any required steps of obtaining and processing content associated with the second Web page may be performed by the currently instantiated network computing component in which the browser can handle the processing of both resource requests. In another embodiment, the client computing device 102 request may be processed as a new browse session request to the network computing provider 107, including the network address of the second Web page. In this embodiment, the browser on the client computing device may not specifically request a separate browse session, and a user's interaction with the browser on the client computing device 102 may appear to be part of a same browsing session. As described above with regard to FIGS. 2A and 3A, the network computing provider 107 may cause an instantiation of a network computing component for obtaining and processing content associated with the second web page. In other embodiments, a new browse session request may be generated by the client computing device 102 corresponding to sections of a network resource (e.g., frames of a Web page), individual network resources, or embedded resources themselves, data objects included in a set of content, or individual network resources.

Illustratively, the additional browse session request may include any number of pieces of data or information including, but not limited to, information associated with a user, information associated with the client computing device 102 (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. Requested content may include any manner of digital content, including Web pages or other documents, text, images, video, audio, executable scripts or code, or any other type of digital resource.

As illustrated in FIG. 6A, subsequent to the receipt of the browse session request the network computing provider 107 may select an associated network computing component such as NCC POP 142 to service the browse session request. As discussed above with reference to FIG. 2A, a network computing provider 107 may select an NCC POP to service a browse session request based on any number of factors, including, but not limited to available NCC POP resources (e.g., available memory, processor load, network load, etc), a financial cost of servicing the browse session request at the NCC POP, the NCC POP location respective to a client computing device 102, content provider 112, or CDN POP 116, a NCC POP cache status (e.g., whether a requested resource is already stored in an NCC POP cache), etc. In one embodiment, the network computing provider 107 may select a number of NCC POPs to service a browse session request. Illustratively, although the network computing provider 107 is depicted here for purposes of illustration as selecting NCC POP 142, the network computing provider 107 may select any extant NCC POP to service the browse session request. For example, a single client computing device 102 may simultaneously or sequentially provide three different browse session requests to the network computing provider 107 corresponding to different network resources. The network computing provider 107 may select different NCC POPs for each browse session request, the same NCC POP for all three browse session requests, or any combination thereof. As discussed above, the decision whether to select a different NCC POP than was utilized for a previous or simultaneous browse session request may be made on the basis of available system resources, randomly, or according to any other factor as discussed above and with regards to FIG. 2A.

As illustrated in FIG. 6B, subsequent to receipt of certificate data from a client computing device 102, access to the certificate data can be provided to the content provider 104 associated with the certificate data, so that the content provider 104 can be made aware of any potentially fraudulent digital certificates being used in its name. The access can be provided at any time after it is received from the client computing device 102, and can be provided in the form of a reporting service, API, web service, etc. For example, a content provider 104 can request access to the data immediately or months after the client computing device 102 transmitted the data to the network computing provider 107. In some embodiments, the content provider 104 may request that the network computing provider 107 transmit some portion of the certificate data at predetermined or dynamically determined intervals, when potentially fraudulent data determined, etc.

Figure 7:
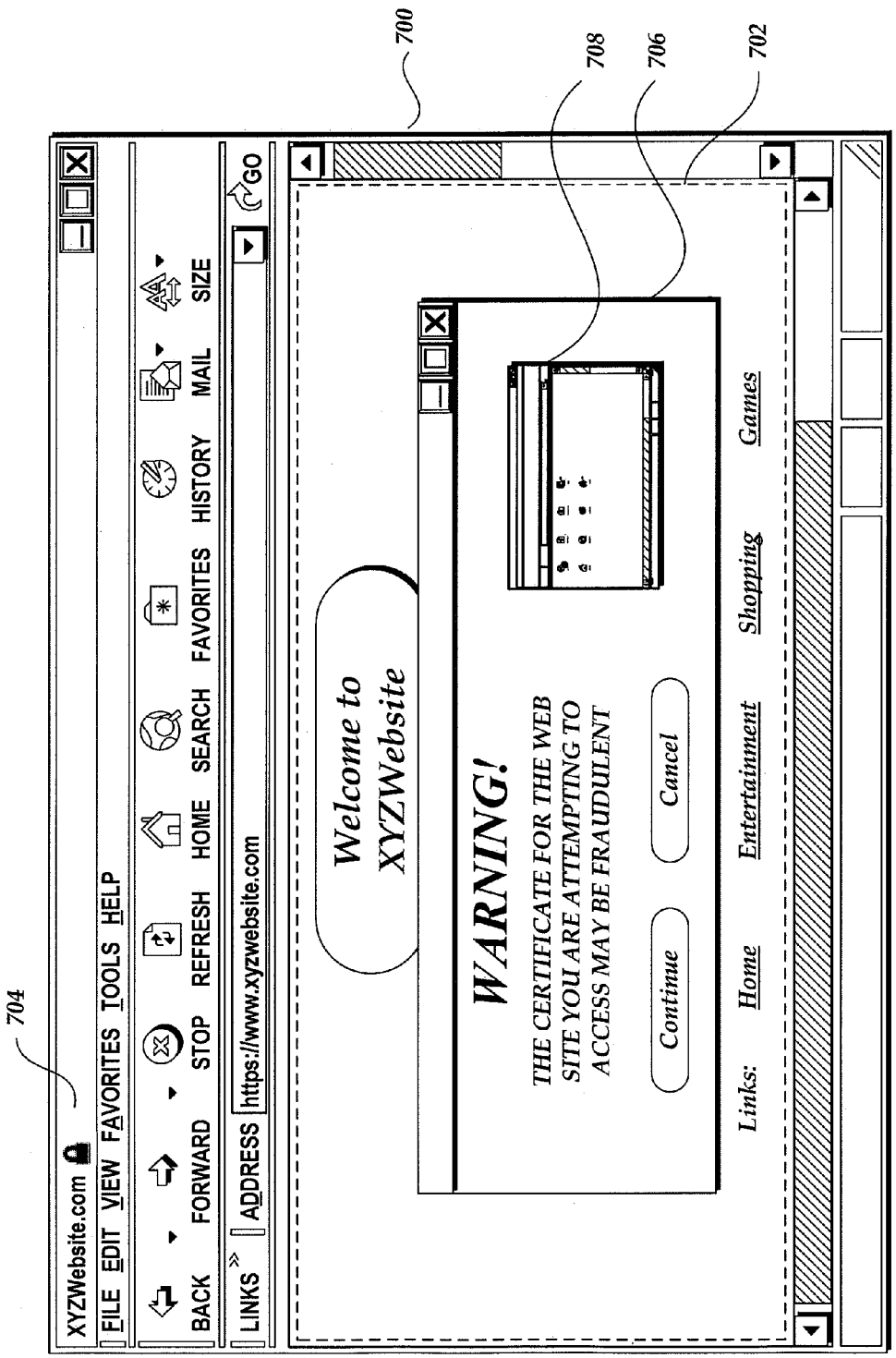
FIG. 7 is a user interface diagram depicting an illustrative browser interface and display of browse session content.

FIG. 7 is a user interface diagram depicting an illustrative browser interface and display of browse session content. As described above with reference to FIG. 5A, a browser 700 may have a content display area 702, as well as one or more one or more local interface components. These local interface components may include toolbars, menus, buttons, address bars, scroll bars, window resize controls, or any other user interface controls. For example, the local interface components can include a title bar 704. Illustratively, local interface components may be displayed as separate from the content display area 702 or may be overlaid or embedded in the content display area 702.

Interactions with local interface components may be treated as local user interactions or remote user interactions depending on the processing required by the interaction and the remote session browsing configuration. For example, the selection of a preferences option in a browser menu may be handled entirely as a local user interaction by a browser. The processing required to display the menu, provide visual feedback regarding the selection, display the preferences window, and process the changes made to the browser preferences may be performed locally. As discussed above, processing user interactions locally may provide greater responsiveness at the browser as opposed to sending user interaction data to the NCC POP 142 for processing. As another example, when using a remote session browsing configuration that specifies extensive processing on the NCC POP 142 (e.g., a remote session browsing configuration using a remote session communication protocol such as RDP), the selection of a content refresh button in a browser toolbar may be handled both as a local user interaction and a remote user interaction. The limited processing required to provide interface feedback corresponding to the button selection may be handled at the client computing device 102 in order to provide the appearance of interface responsiveness, while the refresh command, which may require processing of the network content displayed in the content display area of the browser, may be sent as user interaction data to the NCC POP 142 for processing. The NCC POP 142 may then transmit updated processing results corresponding to the refreshed network content back to the client computing device 102 for display.

In response to receiving an alert from the network computing provider 107, as described above with respect to FIG. 5B, the browser 700 may display an alert box 706. The alert box 706 can include a message to the user of the client computing device 102 indicating that the digital certificate received from a content provider 104 may be fraudulent. The alert box 706 may provide a mechanism to override the alert and load the requested network resource. An image of the requested network resource 708 can be displayed in the alert box 706 to aid the user in determining to override the alert. The image can be created by the network computing provider 107 and transmitted to the client computing device 102 along with the alert. In some embodiments, other visual alerts can be utilized instead of, or in addition to, the alert box 706. For example, some portion of the browser 700 may change color, texture, or flash to indicate that an alert has been received. In another example, an icon can be displayed in the title bar 704 or some other visible area of the browser 700. In some embodiments, and aural indication can be provided to the user of the client computing device 102 that an alert has been received from a network computing provider 107. For example, a beep can sound when an alert is received. In some embodiments, the various visual and aural indications can be combined in any number of ways, can be configured by the user of the client computing device 102 or the network computing provider 107, etc.

Figure 8:
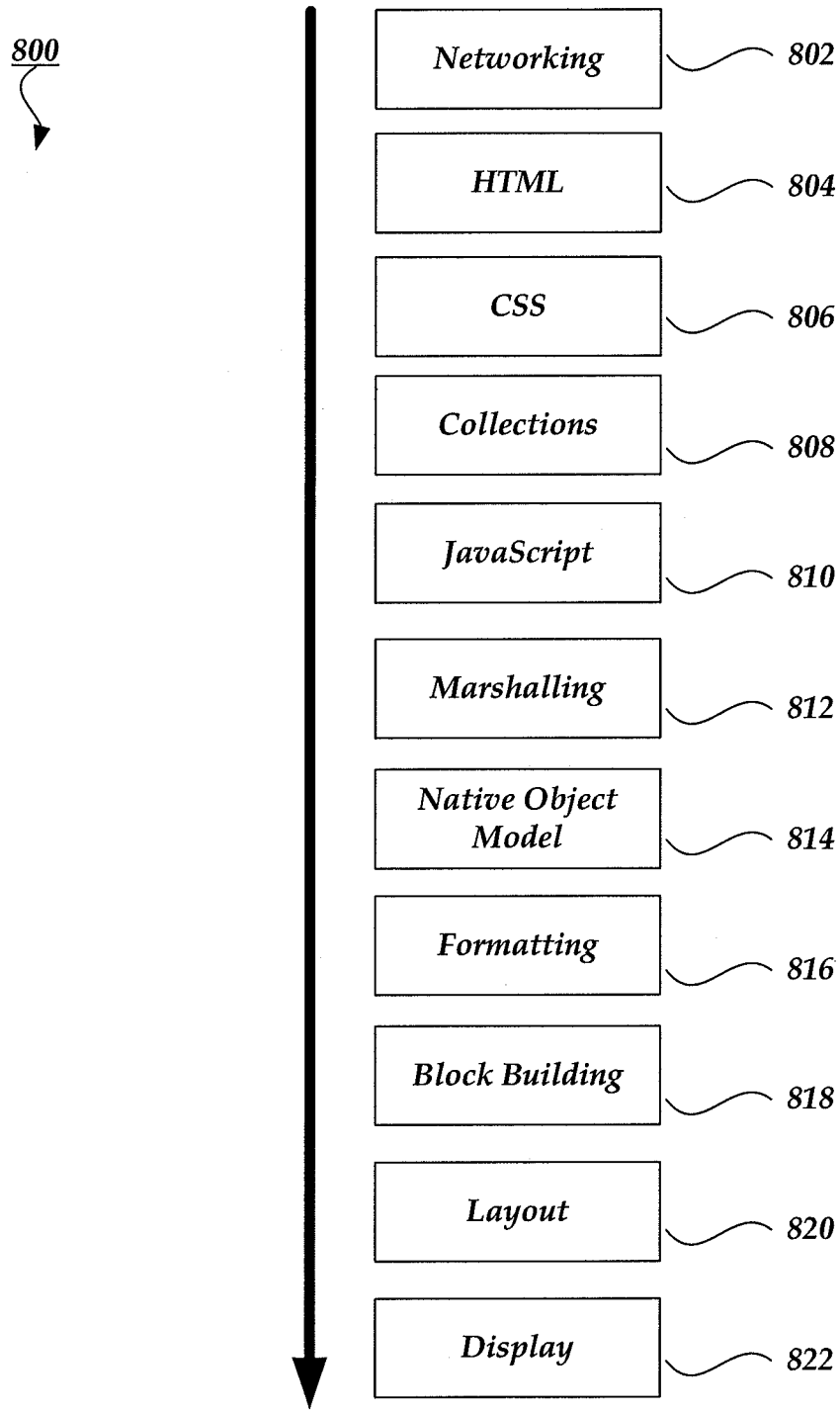
FIG. 8 is a diagram depicting illustrative browser content processing actions as a series of processing subsystems.

FIG. 8 is a diagram depicting illustrative browser content processing actions as a series of processing subsystems 800. In many embodiments, a browser may process sets of content (e.g., network resources such as web pages and associated embedded resources) in a series of processing actions. Illustratively, and as described above with reference to FIGS. 3A-5A, a remote session browsing configuration may specify a split between processing actions performed at a network computing provider (e.g., an NCC POP) and processing actions performed at a client computing device 102. This split may designate some processing actions to be performed by each of the NCC POP and client computing device 102, or may assign all processing actions to a single device or component. For example, an NCC POP may perform all of these various processing actions at the browse session instance, and send fully processed RDP processing results to the client computing device 102 for bitmap assembly and display. Any number of different remote session browsing configurations may be used by one or more browse sessions instances running at an NCC POP.

One of skill in the relevant art will appreciate that the subsystems shown here are depicted for the purpose of illustration, and are not intended to describe a necessary order or a definitive list of browser subsystems. Various browser software components may implement additional or fewer browser subsystems than are shown here, and may order the subsystems or corresponding processing actions in any number of different ways. Although the processing subsystems 800 depicted here for purposes of illustration are directed at the processing of Web pages or other Web content, one of skill in the relevant art will appreciate that the processing of other file types or network resources may be broken up in a similar manner. For example, one of skill in the relevant art will appreciate that a similar schema may be developed for the processing of images, video, audio, database information, 3d design data, or any other file format or type of data known in the art. Similar schema may also be developed for any number of device operating system or software framework processing operations, such as scheduling, memory or file management, system resource management, process or service execution or management, etc. Further, although the HTML protocol and RDP remote session communication protocols are discussed herein for the purposes of example, one of skill in the relevant art will appreciate that a remote session browsing configuration may implement any number of remote communication protocols for any number of specified processing actions, and that a remote session browsing configuration may be formulated to perform any fraction or combination of the actions identified below at any combination of the client computing device 102 and network computing provider 107.

Illustratively, the first processing subsystem involved in the processing and display of network content is the networking subsystem 802. Illustratively, the networking subsystem 802 may be responsible for all communication between the browser and content provider, including local caching of Web content. The networking subsystem is generally limited by the performance of the user's network. A remote session browsing configuration that splits processing actions at the networking subsystem 802 might include a remote session browsing configuration utilizing an HTML remote session communication protocol, where one or more caching or resource retrieval actions were performed at the NCC POP, but parsing and processing of the content was performed at the client computing device.

As network resources such as HTML documents are downloaded from the server they may be passed to an HTML subsystem 804 which parses the document, initiates additional downloads in the networking subsystem, and creates a structural representation of the document. Modern browsers may also contain related subsystems which are used for XHTML, XML and SVG documents. A remote session browsing configuration that splits processing actions at the HTML subsystem 804 might include a remote session browsing configuration utilizing an HTML remote session communication protocol, where an initial HTML page is processed at the NCC POP in order to extract embedded resource identifiers, but additional parsing and processing of the content is performed at the client computing device. In another embodiment, a remote session browsing configuration that splits processing actions at the HTML subsystem 804 might perform initial processing to create the structural representation of the HTML document, and provides a processing result including the structural representation and associated embedded resources to the client computing device for processing.

When CSS is encountered, whether inside an HTML document or an embedded CSS document, it may be passed to a CSS subsystem 806 to parse the style information and create a structural representation that can be referenced later. Illustratively, a remote session browsing configuration that splits processing actions at a CSS subsystem 806 may construct a processing result including the CSS structural representation and HTML structural representation, and provide the processing result and associated embedded resources to the client computing device for processing.

HTML documents often contain metadata, for example the information described in a document header or the attributes applied to an element. The collections subsystem 808 may be responsible for storing and accessing this metadata. A remote session browsing configuration that splits processing actions at a collections subsystem 808 may construct a processing result including processed metadata along with any other structural representations discussed above, and provide the processing result and associated embedded resources to the client computing device for processing.

When Javascript is encountered, it may be passed directly to a JavaScript subsystem 810 responsible for executing the script. The Javascript subsystem 810 has been examined fully over the years, and may be one of the most well known browser subsystems in the art. A remote session browsing configuration that splits processing actions at a Javascript subsystem 810 may construct a processing result including an internal representation of one or more Javascript scripts, including, but not limited to state data or a representation of the script in a native or intermediate form, as well as any other processed structures or data discussed above, and provide the processing result and associated embedded resources to the client computing device for processing.

Because many JavaScript engines are not directly integrated into the browser, there may be a communication layer including the marshalling subsystem 812 between the browser and the script engine. Passing information through this communication layer may generally be referred to as marshaling. A remote session browsing configuration that splits processing actions at a marshalling subsystem 812 may construct a processing result including marshalling data as well as any other processed structures, scripts, or data discussed above, and provide the processing result and associated embedded resources to the client computing device for processing.

In some embodiments, JavaScript interacts with an underlying network resource such as a Web document through the Document Object Model APIs. These APIs may be provided through a native object model subsystem 814 that knows how to access and manipulate the document and is the primary interaction point between the script engine and the browser. Illustratively, a remote session browsing configuration that splits processing actions at a native object model subsystem 814 may construct a processing result including native object model state data or API calls as well as any other processed structures, scripts, or data discussed above, and provide the processing result and any other associated embedded resources to the client computing device for processing.

Once the document is constructed, the browser may needs to apply style information before it can be displayed to the user. The formatting subsystem 816 takes the HTML document and applies styles. Illustratively, a remote session browsing configuration that splits processing actions at a formatting subsystem 816 may construct a processing result including an HTML representation with applied styles, as well as any other processed state data, API calls, structures, scripts, or data discussed above, and provide the processing result and any other associated embedded resources to the client computing device for processing.

In one embodiment, CSS is a block based layout system. After the document is styled, the next step, at a block building subsystem 818, may be to construct rectangular blocks that will be displayed to the user. This process may determine things like the size of the blocks and may be tightly integrated with the next stage, layout. A remote session browsing configuration that splits processing actions at a block building subsystem 818 may construct a processing result including block information, as well as any other processed state data, API calls, structures, scripts, or data discussed above, and provide the processing result and any other associated embedded resources to the client computing device for processing.

Subsequent to the browser styling the content and constructing the blocks, it may go through the process of laying out the content. The layout subsystem 820 is responsible for this algorithmically complex process. Illustratively, a remote session browsing configuration that splits processing actions at a layout subsystem 820 may process the various state data, API calls, structures, scripts, or data discussed above to construct a processing result including layout information for the client computing device. Illustratively, an NCC POP may make use of various data or settings associated with the client computing device or browser (e.g., as provided in the initial browse session request) in order to generate a suitable layout for the client computing device. For example, a mobile device may provide a screen resolution and a display mode to the NCC POP. The NCC POP may base layout calculations on this screen resolution and display mode in order to generate a processing result corresponding to a content representation suitable for a browser running on the mobile device. Illustratively, in various embodiments, any other subsystem implemented by the NCC POP may make use of data associated with the client computing device or browser in generating a processing result for the client.

The final stage of the process may occur inside the display subsystem 822 where the final content is displayed to the user. This process is often referred to as drawing. A remote session browsing configuration that splits processing actions at the networking subsystem 802 might include a remote session browsing configuration utilizing an RDP remote session communication protocol, where nearly all processing is performed at the NCC POP, and a processing result including bitmap data and low level interface data are passed to the client computing device for display.

Figure 9:
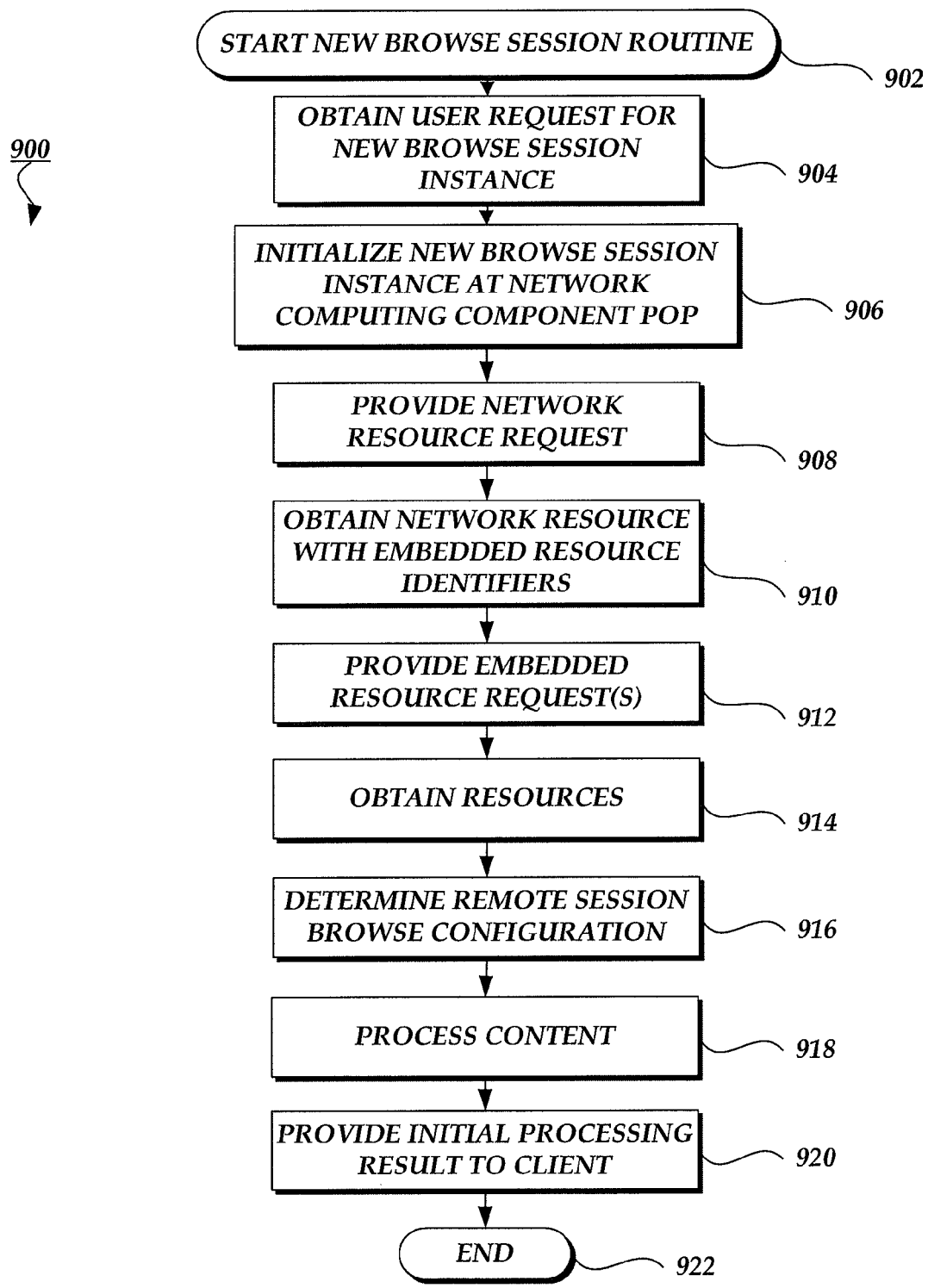
FIG. 9 is a flow diagram illustrative of a new browse session routine implemented by network computing provider.

FIG. 9 is a flow diagram illustrative of a new browse session routine 900 implemented by network computing provider 107 of FIG. 1. New browse session routine 900 begins at block 902. At block 904, the network computing provider 107 receives a new browse session request from client computing device 102. As previously described, the client computing device 102 may load a browser for viewing network content in response to an event or user request. Subsequent to the browser being loaded, the browser may be implemented request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. This browse session request may include one or more addresses or references to various network resources or other content requested by the client computing device 102. In an illustrative embodiment, the browse session request is transmitted in accordance with an API.

At block 906 the network computing provider 107 may select an associated NCC POP to instantiate a new browse session based on the browse session request. As discussed above with reference to FIG. 1, a network computing provider 107 may include any number of NCC POPs distributed across any number of physical or logical locations. A network computing provider 107 may select a NCC POP to service a browse session request based on any number of factors, including, but not limited to available NCC POP resources (e.g., available memory, processor load, network load, etc.), a financial cost of servicing the browse session request at the NCC POP, the NCC POP location respective to a client computing device 102, content provider 104, or CDN POP 116, a NCC POP cache status (e.g., whether a requested resource is already stored in an NCC POP cache), etc.

In one embodiment, the network computing provider 107 may select a number of NCC POPs to service a browse session request. For example, the network computing provider 107 may select two NCC POPs with different logical locations in the network. Each NCC POP may independently request and process network content on the behalf of the client computing device 102, and the client computing device 102 may accept data from the first NCC POP to return a processing result. Subsequent to being selected by the network computing provider 107, NCC POP 142 may obtain the browse session request. In one embodiment, NCC POP 142 may have the browse session request forwarded to it by a component of network computing provider 107. In another embodiment, NCC POP 142 or client computing device 102 may receive connection information allowing the establishment of direct communication between NCC POP 142 and client computing device 102. Illustratively, NCC POP 142 may be provided with the browse session request originally provided to network computing provider 107, may be provided with a subset of information (e.g., just a network address of requested content), or may be provided additional information not included in the original browse session request.

Subsequent to the NCC POP 142 being selected, the network computing provider 107 may cause the NCC POP 142 to instantiate a new browse session. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session. Illustratively, one or more characteristics of the new browse session instance and/or browser instance may be based on client computing device 102 information included in the browse session request. For example, the browse session request may include a device type or browser type, a device screen resolution, a browser display area, or other information defining the display preferences or capabilities of the client computing device 102 or browser. The NCC POP 142 may accordingly instantiate a virtual machine instance and/or a browser instance with the same or similar capabilities as the client computing device 102. Illustratively, maintaining a virtual machine instance and/or browser with the same or similar capabilities as the client computing device 102 may allow the NCC POP 142 to process network content according to the appropriate dimensions and layout for display on the particular client computing device 102.

In some embodiments, the NCC POP 142 may utilize an existing virtual machine instance and/or browser instance in addition to, or as an alternative to, instating a new browse session. For example, subsequent to the NCC POP 142 being selected, the network computing provider 107 may cause the NCC POP 142 to associate an existing browser instance and/or virtual machine instance, such as one or more instances previously instantiated at the NCC POP 142, with the new browse session request. Illustratively, an existing browser session and/or virtual machine instance may correspond to another browse session, remote application session, or other remote process associated with the user or client computing device 102, or may be a previously instantiated software instance from an unrelated browse session or remote process. In other embodiments, the NCC POP 142 may instantiate a new browser or other application process in an existing virtual machine instance, or may combine the utilization of previously instantiated and newly instantiated software processes in any number of other ways. In still further embodiments, the network computing provider or NCC POP 142 may instantiate any number of new virtual machine instances and/or browser instances (or make use of existing instantiated instances) based on a single browse session request.

At block 908 the network computing provider 107 may provide a request for one or more network resources to a content provider or CDN service provider based on a network address included in the browse session request. In various embodiments, one or more network resources may be additionally or alternately retrieved from a cache local to the NCC POP 142 or otherwise associated with the network computing provider 107. One of skill in the art will appreciate that, in the case of other embodiments, the link or network address may correspond to a document or file stored in a digital file locker or other network storage location or at a cache component associated with the network computing provider 107 or client computing device 102. In some embodiments, the new session request may include a document or file in addition to or as an alternative to a network address. At block 910, the network computing provider 107 obtains the one or more network resources. Subsequent to obtaining the requested network resource, the NCC POP 142 may process the network resource to extract embedded resource identifiers.

At block 912, the network computing provider 107 may provide resource requests to one or more sources of content such as content providers, CDN service providers, and caches. The resource requests may correspond to embedded resources based on the one or more embedded resource identifiers extracted from the one or more network resource as described in block 910 above. At block 914, the network computing provider 107 may obtain these embedded resources from any number of different sources, sequentially or in parallel.

At block 916, the network computing provider 107 may process the one or more network resources and associated embedded resources to determine a remote session browsing configuration for the processing and communication of content to the client computing device 102. A remote session browsing configuration may include any proprietary or public remote protocol allowing exchange of data and user interactions or requests between a client and a remote server. The remote session browsing configuration may illustratively include both a remote session communication protocol and a processing schema for providing processed (or unprocessed) content to a client computing device for display in the content display area of a browser.

Illustratively, a remote session browsing configuration may define or specify a remote session communication protocol, including, but not limited to, a network protocol, signaling model, transport mechanism, or encapsulation format for the exchange of state data, user interactions, and other data and content between the network computing provider and the client computing device. Examples of remote session communication protocols known in the art include Remote Desktop Protocol (RDP), X-Windows protocol, Virtual Network Computing (VNC) protocol, Remote Frame Buffer protocol, HTML, etc. For example, RDP illustratively specifies a number of processing mechanisms for encoding client input (e.g., mouse movement, keyboard input, etc.) into protocol data units for provision to a remote computing device, and corresponding mechanisms for sending bitmap updates and low level interface information back to the client device. As another example, the HTML protocol illustratively provides a mechanism for providing files defining interface information and containing resources references from a server to a client, and a corresponding mechanism for a client computing device to provide requests for additional files and resources to the server. In one embodiment, the NCC POP 142 may provide an initial communication to the client computing device 102 after determining the remote session communication protocol. This initial communication may allow the client computing device 102 to prepare to receive communications in the selected remote session communication protocol, and, in the case of pull remote session communication protocols like HTTP, may cause the client computing device to send an initial resource request to the browse session instance running on the NCC POP 142.

Each remote session browsing configuration may additionally define a split of processing actions between the network computing and storage service (e.g., NCC POP 142) and the client computing device (e.g., client computing device 102). In one embodiment, a particular split of processing actions may be based on or mandated by a particular remote session communication protocol. In another embodiment, a remote session communication protocol may allow several different splits of processing actions depending on the implementation or configuration of the protocol. For the purpose of illustration, many pieces of network content (e.g., Web pages, video, Flash documents) may require various processing actions before being displayed on a computing device. A Web page, for example, may be parsed to process various HTML layout information and references to associated resources or embedded content such as CSS style sheets and Javascript, as well as embedded content objects such as images, video, audio, etc. The HTML and each referenced object or piece of code will typically be parsed and processed before a representative object model corresponding to the Web page may be constructed. This object model may then be processed further for layout and display in a content display area of a browser at the client computing device 102. Illustrative browser processing actions are described in greater detail below with reference to FIG. 8. One of skill in the art will appreciate that, in the case of other embodiments or applications, various other processing actions may be required.

A remote session browsing configuration may specify that various of the processing actions required for display of piece of network content be performed at the remote computing device, such as the NCC POP 142, rather than at the client computing device 102. Network content partially (or wholly) processed at the network computing provider may be referred to as a processing result. As discussed below, the split of processing actions may be associated with or linked to the remote session communication protocol used for exchanging data and client input between the NCC POP 142 and client computing device 102.

For example, a remote session communication protocol such as RDP that transmits a processing result including low level interface information and bitmaps to the client computing device 142 for display may be associated with a remote session browsing configuration that specifies performing all, or nearly all, of the necessary content processing actions at the NCC POP 142. While using RDP, the NCC POP 142 may, for example, run a full instance of a browser the NCC POP 142 and transmit a processing result consisting of bitmap updates corresponding to a representation of the displayed content to the client computing device 102. The client computing device 102, in this example, may merely be required to assemble the transmitted bitmap updates for display in the content display area of the browser, and may perform none of the processing of the actual HTML, Javascript, or data objects involved in the display of an illustrative piece of network content. As another example, a remote session browsing configuration utilizing a remote session communication protocol such as HTML may transmit network content in a largely unprocessed form. The client computing device 102 may thus perform all of the processing actions required for display of network content while the NCC POP 142 performs little or no processing.

The NCC POP 142 may base its determination of a remote session browsing configuration on any number of factors, including, but not limited to, one or more characteristics of one or more of the requested resources, content provider 104, or CDN service provider 106, one or more characteristics of the content address or domain, one or more characteristics of the client computing device 102, browser or application, user, one or more characteristics of the NCC POP 142, or one or more characteristics of the network or network connection, etc. Characteristics of requested resources may include, but are not limited to, a data format, a content type, a size, processing requirements, resource latency requirements, a number or type of interactive elements, a security risk, an associated user preference, a network address, a network domain, an associated content provider, etc. Characteristics of a content provider 104, CDN service provider 106, computing device 102, or NCC POP 142 may include, but are not limited to, processing power, memory, storage, network connectivity (e.g., available bandwidth or latency), a physical or logical location, predicted stability or risk of failure, a software or hardware profile, available resources (e.g., available memory or processing, or the number of concurrently open software applications), etc. The NCC POP 142 may further consider perceived security threats or risks associated with a piece of content or domain, preferences of a client computing device or a content provider, computing or network resource costs (e.g., a financial cost of processing or bandwidth, resource usage, etc.), predetermined preferences or selection information, any additional processing overhead required by a particular remote session browsing configuration, a cache status (e.g., whether a particular resources is cached at a NCC POP 142, at the client computing device 102, or at other network storage associated with the network computing provider), a predicted delay or time required to retrieve requested network content, a preferred content provider or agreements with a content provider for a particular remote session browsing configuration or level of service, a remote session browsing configuration being used for another (or the current) browse session by the same user, or any other factor.

In some embodiments, an NCC POP 142 may base a determination of a remote session browsing configuration on past behavior or practice. For example, an NCC POP 142 that has determined a remote browse session configuration for a particular resource in the past may automatically select the same remote browse session configuration when the resource is requested by the same (or potentially a different) user. As another example, a user that has a history of frequently accessing Web sites with extensive processing requirements may automatically be assigned a remote session browsing configuration that performs the majority of processing at the NCC POP 142. In other embodiments, an NCC POP 142 may base a determination of a remote browse session configuration on predictions of future behavior. For example, an NCC POP 142 may base its determination of a remote browse session configuration for a particular resource on an analysis of past determinations made for a particular Web site, network domain, or set of related resources. A content provider that historically has provided video-heavy Web pages may be associated with a remote session browsing configuration that emphasizes video performance at the client computing device 102. Illustratively, past historical analysis and future predictions may be considered as one or more of a number of factors on which to base the remote session browsing configuration determination process, or may be definitive in the decision making process. For example, once an NCC POP 142 determines a remote session browsing configuration for a particular content provider, it may skip the remote session browsing configuration determination process for any future resources served from the content provider. Illustratively, the NCC POP 142 may re-determine a remote session browsing configuration to be associated with the content provider after a fixed period of time, or after the NCC POP 142 has identified or determined a change in the content being served by the content provider.

In other embodiments, a network resource, Web site, network domain, content provider, or other network entity may specify or otherwise request the use of a particular remote browse session configuration in a resource tag, metadata, or other communication with an NCC POP 142. The NCC POP 142 may treat the request as definitive, or may consider the request as one of multiple factors to be considered in the decision making process.

For example, a remote session browsing configuration utilizing a remote session communication protocol such as RDP may specify extensive processing to occur at the network computing provider 107 (e.g., at NCC POP 142) rather than at the client computing device 102. The remote session browsing configuration may thus leverage the processing power of the NCC POP 142 to achieve lower latencies and presentation delay when dealing with network content that requires a great deal of pre-processing (e.g., content with a great deal of CSS or Javascript information defining page layout). The NCC POP 142 may therefore select a remote session browsing configuration that performs a substantial amount of processing at the network computing provider 107 and utilizes RDP or a similar remote session communication protocol for communication of processing-intensive content. Conversely, a remote session browsing configuration that utilizes a remote session communication protocol such as HTML may specify extensive processing at the client computing device 102 rather than at the network computing provider 107. The remote session communication protocol may thus achieve smaller delays and smoother presentation when presented with simple network content that requires very little processing or network content that requires rapid change in displayed content after its initial load. For example, a Web page with embedded video may perform better performing the majority of processing locally and utilizing HTML rather than RDP as a remote session communication protocol. A remote session browsing configuration specifying extensive processing at the network computing provider 107 must process the video at the NCC POP 142 and rapidly send screen updates (e.g. by RDP) to the client computing device 102, potentially requiring a great deal of bandwidth and causing choppy playback in the browser, while a remote session browsing configuration specifying local processing may provide raw video information directly to the client computing device 102 for display (e.g. by HTML), allowing for client side caching and a smoother playback of content.

As a further example, the NCC POP 142 in communication with a client computing device 102 with extremely limited processing power may elect to use a remote session browsing configuration that requires very little processing by the client computing device, for example, using RDP to transmit NCC POP 142 processed results. Conversely, an NCC POP 142 providing an extremely interactive Web page may elect to use a remote session browsing configuration that allows the client computing device 102 to handle user interactions locally in order to preserve interface responsiveness, for example, using HTML to transmit substantially unprocessed data. As a still further example, a NCC POP 142 may base the determination of a remote session browse configuration on preferences provided by the client computing device 102. A client computing device 102 may illustratively include preferences for a remote session browse configuration in an initial browse session request, or at any other time. The NCC POP 142 may utilize these preferences as an alternative to, or in addition to any other factor or decision metric. Illustratively, allowing the client computing device 102 to set or influence the selection of a remote session browse configuration allows the NCC POP 142 to take user preferences in account when determining a remote session browse configuration. For example, a user worried about initial page load times may prefer to use a remote session browsing configuration heavy on remote processing and utilizing an RDP remote session communications protocol, while a user wishing to maintain an extremely responsive interface may prefer using a remote session browsing configuration that performs the majority of the processing on the client computing device 102, for example, using an HTML remote session communication protocol.

Illustratively, the NCC POP 142 may base a determination of a remote browsing configuration on any factor or combination of factors. For example, the NCC POP 142 may select a remote session browsing configuration based on a single factor, or may assign weights to one or more factors in making a determination. In some embodiments, the determination process of the NCC POP 142 may change based on one or more factors described above. For example, an NCC POP 142 communicating with a client computing device 102 over a network with a surplus of unused bandwidth may give a low weight to factors such as the network requirements of a remote browse session, and may give a higher weight to factors such as the latency of page interactions, while an NCC POP 142 communicating with a client computing device 102 over a limited bandwidth network may give a higher weight to factors dealing with the efficiency of the remote session browse protocol over a network.

In one embodiment, the NCC POP 142 may select a single remote session browsing configuration for a set of network content. For example, the NCC POP 142 may select a single remote session browsing configuration for a requested network resource such as a Web page. The NCC POP 142 may thus process the Web page together with all embedded content based on the selected remote browsing session protocol, and utilize the remote browsing session protocol to exchange user interaction data and updated browse session data for all embedded content associated with the Web page. In another embodiment, the NCC POP 142 may select different remote session browsing configurations for one or more resources in a set of network content. For example, a network resource such as a Web page may reference processing intensive embedded Javascript or CSS resources, as well as embedded video resources. The NCC POP 142 may select a first remote session browsing configuration for the Web page and all embedded resources excluding the embedded video resource, and a second remote session browsing configuration for the embedded video resource. Illustratively, this may result in the NCC POP 142 utilizing RDP to send a processing result to the client computing device 102 for display of the Web page and associated embedded resources, while utilizing HTTP to send the embedded video as a separate, unprocessed file. In one embodiment, the client computing device 102 may perform the minimal processing required to display the RDP processing result corresponding to the Web page and embedded resources, and may also perform additional processing necessary to display the embedded video, for example, overlaying the video on top of the displayed RDP representation of the Web page. Any number of remote session browsing configurations may be selected to correspond to any number of resources or objects included in a set of network content, regardless of whether resources or objects are obtained from a content provider 104 or CDN service provider 106 in one or more logical files or data structures.

Although the selection of a remote session browsing configuration is illustratively depicted herein as occurring after all network resources and associated embedded content have been obtained by the NCC POP 142, one skilled in the relevant art will appreciate that the selection of a remote session browsing configuration may be performed at any time. For example, the NCC POP 142 may select a remote session browsing configuration after receiving a new browse session request or related information from the client computing device, may select a remote session browsing configuration after obtaining a network resource, but before obtaining any associated embedded resources, or at any other time. In some embodiments, the NCC POP 142 may switch to a new remote session browsing configuration at some time subsequent to the client computing device 102 obtaining an initial processing result. Illustratively, the NCC POP 142 selecting a new remote session browsing configuration may occur automatically after a certain time period or event or in response to a change in network conditions, NCC POP 142 or client computing device 102 load or computing resources, or any other factor described above as potentially influencing the choice of remote session browsing configuration. Illustratively, an NCC POP 142 dealing with other types or formats of information may select a remote session protocol based on any number of similar factors. For example, one of skill in the relevant art will appreciate that a similar schema may be developed for the processing of images, video, audio, database information, 3d design data, or any other file format or type of data known in the art.

The client computing device 102 may, in various embodiments, further instantiate a parallel browsing process sequentially or simultaneously with the request for a remote browse session. In one embodiment, a client computing device 102 may instantiate a traditional local browse session as known in the art (e.g., providing content requests from the browser and processing obtained resources locally) in addition to one or more remote browse instance executing at an NCC POP 142. In another embodiment, a client computing device 102 may be provided with unprocessed network resources by the NCC POP 142. Illustratively, the network resources may have been retrieved from one or more content providers, CDNs, or cache components by the NCC POP 142. The resources may be provided to the client computing device 102 to process locally in parallel with the remote browse instance executing at the NCC POP 142. In still further embodiments, the network computing provider or NCC POP 142 may instantiate any number of new virtual machine instances and/or browser instances (or make use of existing instantiated instances) to process resources and/or send processing results to the client computing device 102 in parallel. Illustratively, the local browse session at the client computing device 102 and the remote browse session instance at the NCC POP 142 may execute in parallel.

In one embodiment, a local browse session executing at the client computing device 102 may obtain unprocessed content (e.g., html Web pages, embedded content, and other network resources) from the NCC POP 142 responsive to a browse session request. Illustratively, the content may have been retrieved by the NCC POP 142 from a content provider, CDN, or cache in response to the browse session request. The unprocessed content provided by the NCC POP 142 may include all the content associated with the browse session request or may supplement content existing in a cache of the client computing device, retrieved from a content provider or CDN, or obtained from some other source. In one embodiment, a client computing device 102 may obtain all requested content from a local cache, and may not obtain any unprocessed resources or content from the NCC POP 142. Subsequent to obtaining the unprocessed content, client computing device 102 may process the requested content in parallel with a remote browse session executing at the NCC POP 142. For example, as the local browse session executing at the client computing device 102 is processing the requested content, a remote browse session executing at the NCC POP 142 may be processing the same content at substantially the same time. Once the NCC POP 142 has performed a set of processing actions on the content to generate a processing result (e.g., as specified by a determined remote session browsing configuration), the NCC POP 142 may provide the processing result to the client computing device 102.

For the purpose of illustration, a client computing device 102 may require a longer load time to obtain and process requested network resources than a browse session instance running at the NCC POP 142. For example, the NCC POP 142 may obtain and process content quickly due to its position on the network and the relative processing power of the local client computing device as compared to the NCC POP 142. Even if the NCC POP 142 provides the client computing device 102 with all requested network content, the client computing device 102 may still obtain a processing result from NCC POP 142 before the local browse session has fully completed processing the requested resources. The client computing device 102 may complete any further processing steps and display the obtained processing result before completing local processing and display of the content. Illustratively, this may allow the client computing device 102 to take advantage of an NCC POP 142's quicker content load time relative to a traditional local browse session. Prior to the local browse session completing the processing all requested resources, the browser may process any user interactions locally and/or remotely as described in FIGS. 5A and 11 below.

Once the local browse session has fully obtained and processed resources corresponding to the requested content, the computing device 102 may determine whether to continue to display results obtained from the NCC POP 142 (and process user interactions at the NCC POP 142) using the determined remote session browsing configuration or switch to processing user interactions locally. Switching to process user interactions locally may include replacing a displayed representation of the requested resources based on a processing result obtained from the NCC POP 142 with a local display of the requested resources. For example, a browser may display a representation of a Web page corresponding to a processing result from the NCC POP 142 (e.g., RDP display information representing the rendered page) until the browser is finished processing and rendering the Web page locally. The browser may then replace the representation from the NCC POP 142 with the locally rendered representation of the Web page. Illustratively, replacing one representation with another representation may be transparent to the user. For example, the local and NCC POP 142 representations of the Web page may be identical or substantially identical. In one embodiment, when the NCC POP 142 representation of the web page is displayed, the browser may send various user interactions with the displayed page to the NCC POP 142 for processing. When the locally rendered version of the Web page is displayed, user interactions may be processed locally at the browser. Illustratively, the determination of which representation of the requested resources to display (e.g., local or from the NCC POP 142) may be based on any of the same factors described with reference to determining a remote session browse protocol in above.

In one embodiment, the client computing device 102 may switch to processing user interactions locally as soon as local resources are fully loaded. Illustratively, the remote browse session instance running at the NCC POP 142 may be terminated after switching to local processing, or the remote browse session instance may be maintained as a backup in case of unresponsiveness or a failure with regards to the local browse session. For example, the client computing device 102 may process user interactions locally, as well as sending remote user interaction data to the NCC POP 142 in accordance with the selected remote session browsing configuration. The remote user interaction data may be used by the NCC POP 142 to keep the remote browse session instance fully in parallel with the local browse process being executed by the browser at the client computing device 102. As long as the local browse session continues to handle user interactions, the NCC POP 142 may either refrain from sending updated processing results, or may send updated processing results ignored by the client computing device 102. If a problem develops with the local browse session at the client computing device 102, updated processing results may be provided to the client computing device 102 from the NCC POP 142 for processing and display in lieu of the local browse session. Illustratively, this switch from the local browse session to remote processing may be transparent to the user. In some embodiments, the client computing device 102 may switch from a local browse session to a remote browse session instance based on factors other than unresponsiveness or failure at the local browser. For example, the client computing device 102 or network computing and storage component 107 may select between a remote and local browse session based on any of the factors enumerated with regards to determining a remote session browse protocol above.

In another embodiment, the client computing device 102 may continue to process and display updated processing results from the NCC POP 142 even after the local browse session has fully loaded the requested content. The client computing device 102 may terminate the local browse session or may run the local browse session in parallel as a backup process in the converse of the example provided above. It should be appreciated that although the local browse session is described here for the purpose of illustration as being slower to load than the remote browse session instance, in some embodiments the local browse session may load the content faster than the remote browsing session, in which case the browser may process user interactions locally until the remote browse process has fully loaded the requested content. In some embodiments, the client computing device 102 may display and process user interactions through whichever browse session, local or remote, loads the requested content first.

In various other embodiments, the network computing provider 107 may instantiate multiple remote browse session instances to run in parallel in addition to or as an alternative to instantiating a local browse session. Illustratively, these parallel browse session instances may utilize any of the same or different remote session browse protocols, and may act as backups in the manner described above with regard to a local browse session, or may be used and switched between as alternatives in order to maximize browser performance at the client computing device 102. For example, in response to one or more browse session requests, the network computing provider 107 may instantiate a browse session instance running on a first NCC POP and utilizing an RDP protocol as well as browse session instance running on a second NCC POP utilizing an X-Windows protocol. The client computing device 102 or the network computing provider 107 may determine which browse session instance and protocol should be used based on performance or resource usage considerations as described with regards to determining a remote session browse protocol above.

With continued reference to FIG. 9, at block 918, the network computing provider 107 may process the obtained content, including the one or more requested network resources and embedded network resources, according to the determined remote session browsing configuration to generate an initial processing result. At block 920, the network computing provider 107 may provide the initial processing result to the client for further processing and display in the content display area of the browser. For the purposes of further example, an illustrative client new browse session interaction routine 1000 implemented by client computing device 102 is described below with reference to FIG. 10. At block 922, the start new browse session routine 900 ends.

Figure 10:
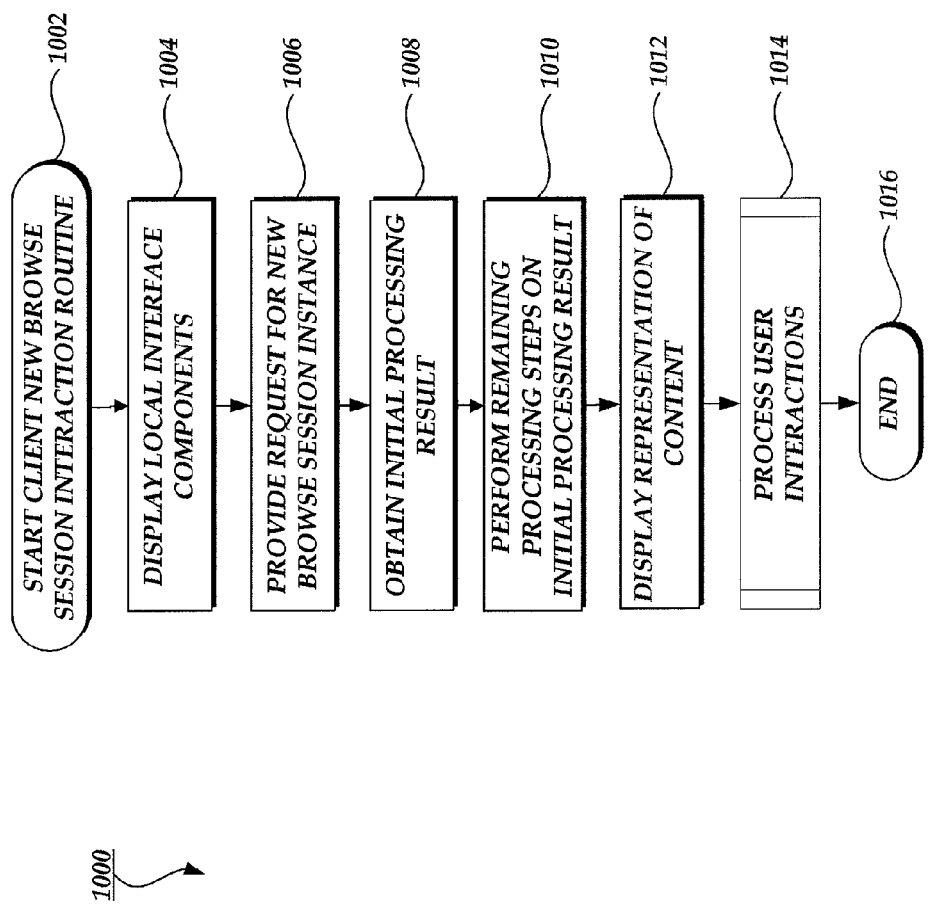
FIG. 10 is a flow diagram illustrative of a client new browse session interaction routine implemented by a client computing device.

FIG. 10 is a flow diagram illustrative of a client new browse session interaction routine 1000 implemented by client computing device 102. New browse session interaction routine 1000 begins at block 1002 in response to an event or user request causing the client computing device 102 to load a browser for viewing network content. At block 1004, the client computing device loads locally managed components of the browser, including all local interface components. As described above with reference to FIGS. 5A and 7, local interface components may include toolbars, menus, buttons, or other user interface controls managed and controlled by the software browser application or any other process executing or implemented locally at the client computing device. At block 1006, the client computing device 102 provides a request for a new browse session instance to the network computing provider 107. From the perspective of the user of the client computing device, the request for the new browse session corresponds to the intended request to transmit the request to one or more corresponding content providers 104. In other embodiment, the new session request may correspond to a request to load a file or other document (e.g., a request to load an image in a photo-editing application, etc.). Illustratively, the request may be generated automatically as a result of the browser loading (e.g., a request for a default or "home" page), or may be generated as a result of a user following a link or entering a network address into an address bar. As illustrated with respect to FIG. 2A, the browse session request is transmitted first to a network computing provider 107. In an illustrative embodiment, the network computing provider 107 utilizes a registration API to accept browse session requests from the client computing device 102.

A browse session request may include any number of pieces of data or information including, but not limited to, information associated with a user, information associated with the client computing device 102 or software on the client computing device (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. For example, a browse session request from the client computing device 102 may include information identifying a particular client computing device hardware specification or a hardware performance level, latency and bandwidth data associated with recent content requests, a desired security level for processing different types of content, a predetermined preference list of remote session browse protocols, and one or more network addresses corresponding to requested network resources, among others. In another example, the browse session request can include information identifying a client computing device 102 screen resolution, aspect ratio, or browser display area in the browse session request may allow the network computing provider 107 to customize the processing of network content for display on the client computing device. As previously described, the browse session request can include network address information corresponding to a requested network resource, which may be in any form including, but not limited to, an Internet Protocol ("IP") address, a URL, a Media Access Control ("MAC") address, etc. In one embodiment, the request for a new browse session instance may correspond to the network computing provider receiving a request for a new browse session instance at block 904 of FIG. 9 above.

At block 1008, the client computing device 102 obtains an initial processing result from the network computing provider 107. Illustratively, the format and data included in the initial processing result may vary based on the remote session browsing configuration selected by the network computing provider 107. In one embodiment, the initial processing result may include or be preceded by data informing the client computing device 102 of the choice of remote session browsing configuration and/or establishing a connection over the remote session communication protocol corresponding to the selected remote session browsing configuration. As discussed above with reference to FIGS. 8 and 9, the obtained initial processing result may include requested content with one or more processing actions performed by the network computing provider 107. Subsequent to obtaining the initial processing result, the client computing device 102 may perform any remaining processing actions on the initial processing result at block 1010.

At block 1012, the client computing device 102 displays the content corresponding to the processed initial processing result. For example, the client computing device 102 may display the processed client in the content display area 702 of a browser 700 as described in FIG. 7 above. In one embodiment, the processing result may only include display data corresponding to content displayed by a browser, and may not include display data corresponding to, for example, the interface controls of a browser instance at the NCC POP 142, the desktop of a virtual machine instance corresponding to the browse session, or any other user interface of the NCC POP 142. For example, the NCC POP 142 may process a Web page and associated content for display via RDP in a browser instance running in a virtual machine instance at the NCC POP 142. The browser instance may have one or more interface elements such as toolbars, menus, scroll bars, etc., in addition to the displayed Web page. The NCC POP 142 may send an RDP processing result corresponding to the displayed Web page only, without any of the interface elements associated with the browser. Illustratively, including an RDP processing result corresponding to the displayed Web page only may allow the browser at the client computing instance 102 to display the Web page by assembling the RDP processing result in the content display area of the browser without any further processing. In another embodiment, the RDP processing result may include a full virtual machine desktop and browser window corresponding to the full interface displayed at the NCC POP 142 browse session instance. The client computing device may automatically identify the area of the RDP processing result corresponding to the requested content, and may display only this area in the content display area of the browser.

At block 1014, the client computing device 102 processes local and remote user interactions. An illustrative routine for processing user interactions is provided below with reference to FIG. 11. At block 1016 the routine ends. Illustratively, a browse session instance instantiated by the network computing content provider 107 may terminate when a browser window or content display area is closed, may terminate when a remote session browse protocol is replaced by a parallel process at the client computing device 102, or may terminate in accordance with a timer or other event. Illustratively, if a browse session has terminated automatically due to a time-out but has associated content still displayed in a browser at the client computing device 102, later attempts by the user to interact with the content may result in a new browse session request being provided to the network computing and storage service provider 107 to start a new browse session according to the last state of the terminated session. Illustratively, terminating a remote browse session after a time-out may allow the network computing storage provider 107 to save computing resources at the NCC POP. In one embodiment, this process may be transparent to the user at client computing device 102, even though the remote browse session has been terminated during the intervening period.

Figure 11:
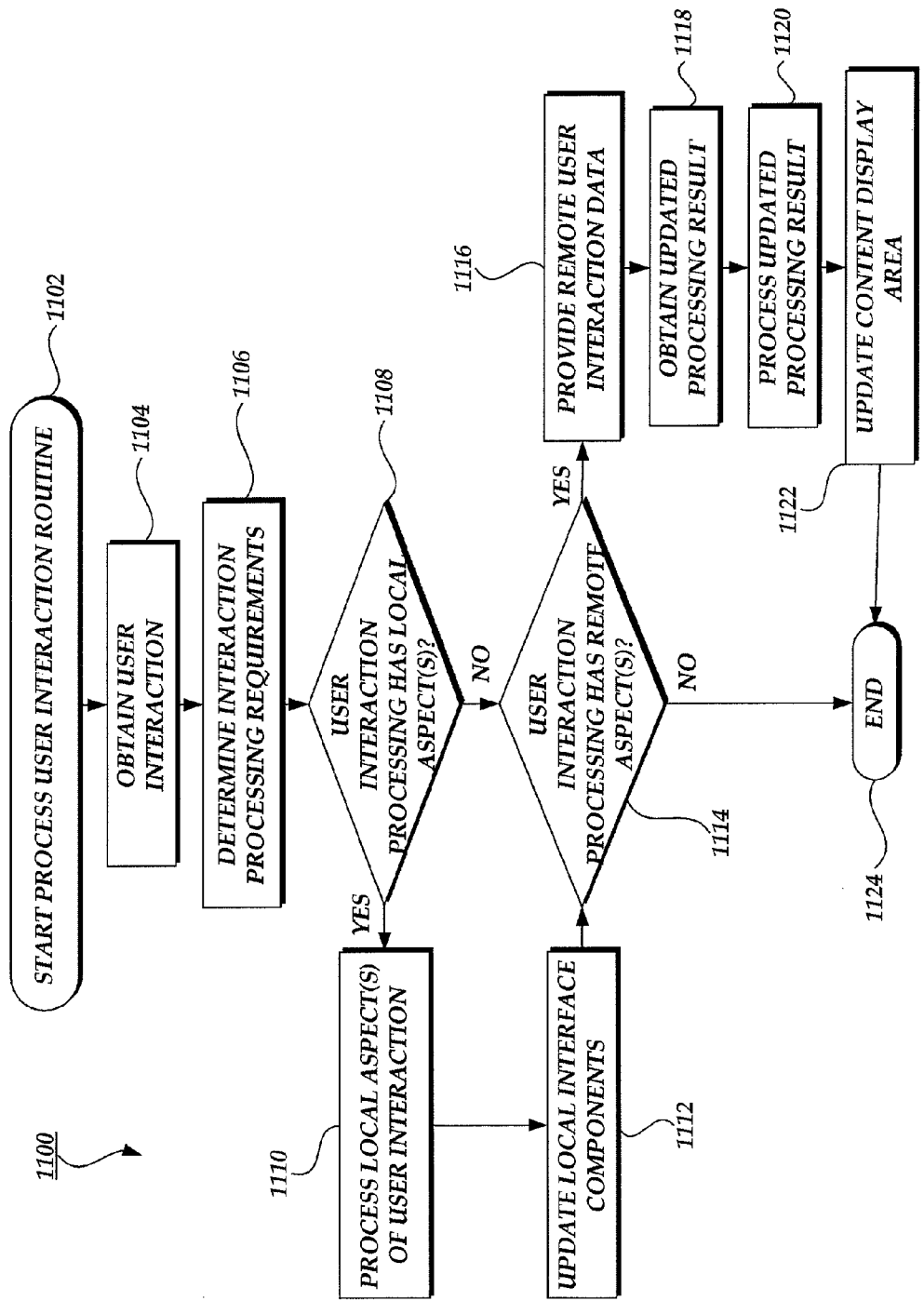
FIG. 11 is a flow diagram illustrative of a process user interaction routine implemented by a client computing device.

FIG. 11 is a flow diagram illustrative of a process user interaction routine 1100 implemented by a client computing device 102. Process user interaction routine 1100 begins at block 1102 in response to an interaction by a user. Illustratively, process user interaction routine 1100 may begin subsequent to the display of content in a content display area of a browser interface. For example, process user interaction routine 1100 may correspond to block 1014 of FIG. 10 above.

Illustratively, the displayed content may have one or more interactive elements, such as forms, buttons, animations, etc. User interaction with these interactive elements may require processing and display of updated content in the content display area. For example, selecting an element in a drop-down menu on a Web page may require processing and may change the configuration or visual appearance of the Web page or embedded resources. Illustratively, the processing required by user interaction with the displayed content may be handled as a local user interaction at the client computing device 102 or as a remote user interaction at the NCC POP 142 depending on the remote session browsing configuration in use. For example, if a remote session browsing configuration utilizing substantial local processing (e.g., sending unprocessed files over HTML), user interactions with displayed content may typically be handled as local user interactions at the client computing device 102. Illustratively, handling user interactions with displayed content as local user interactions at the client computing device 102 may allow for better responsiveness and fewer delays with simple user interactions (e.g., selection of a radio button, or typing text into a field), as interaction data corresponding to the interaction does not need to be sent to the NCC POP 142 for processing.

As a further example, if a remote session browsing configuration utilizing heavy remote processing of content (e.g., sending processed bitmap data over RDP) is being used as the remote session browsing configuration, all user interactions with displayed content may be handled as remote user interactions. For example, user input (e.g., keyboard inputs and cursor positions) may be encapsulated in RDP protocol data units and transmitted across network 108 to the NCC POP 142 for processing. Illustratively, the NCC POP 142 may apply the user interactions to the network content and transmit processing results consisting of updated bitmaps and interface data corresponding to an updated representation of the content back to the client computing device 102. Illustratively, handling user interactions with displayed content as remote user interactions at the NCC POP 142 may have a negative impact on interface responsiveness, as data is required to pass over the network and is limited by network latency; however, user interactions that require a substantial amount of processing may perform better when handled as remote user interactions, as the processing latency of the NCC POP 142 may be substantially lower than the processing latency of the client computing device 102.

In addition to a content display area for displaying network content, a browser may have one or more local interface components, such as toolbars, menus, buttons, or other user interface controls. Interactions with local interface components may be treated as local user interactions or remote user interactions depending on the processing required by the interaction and the remote session browsing configuration as further depicted in illustrative FIG. 7. For example, some local interface components may be managed locally by browser code running on the client computing device, while other local interface components may have one or more locally managed aspects (e.g., button click feedback, scroll bar redraw, etc), and one or more remote managed aspects treated as remote user interactions (e.g., page refresh, requesting a page at an address in an address bar, etc.)

At block 1104, the client computing device 102 obtains a user interaction from the user. This user interaction may be an interaction with local interface components as described in FIG. 7 and above, or may be an interaction with any interactive elements of the content displayed in the content display area of the browser, such as form fields, buttons, animations, etc. User interaction with these local interface components or interactive elements of displayed content may require local and/or remote processing depending on the nature of the component or element and the processing split specified by the remote session browsing configuration as described in FIG. 7 and above. At block 1106, the client computing device 102 determines the interaction processing requirements for the obtained user interaction. At decision block 1108, if the user interaction has local aspects (e.g., button click feedback, a change to a local browser state, a content element being processed at the client computing device, etc.) the routine 1102 moves to block 1110 to process the local aspect or aspects of the user interaction at the client computing device 102 and subsequently update the local interface components at block 1112. Illustratively, and as discussed above, aspects of the interaction and updating interface components and elements locally allows a browser to provide responsive user interfaces and content. Subsequent to processing local aspect(s) of the user interaction, or if the user interaction has no local elements (e.g., a user interaction with a content element displayed in the content display area when using a remote session browsing configuration processing entirely on the server side and utilizing an RDP remote session communication protocol) the routine 1102 moves to decision block 1114. If the user interaction has remote aspects that require processing, the routine 1102 moves to block 1116 and provides remote user interaction data to the network computing provider 107. Illustratively, in the case of a heavily server side remote session browsing configuration utilizing an RDP remote session communication protocol, the remote user interaction data may include input data such as a cursor position or keyboard input encapsulated in one or more RDP protocol data units. In some embodiments of remote session browsing configurations utilizing RDP or other remote session communication protocols, particular aspects of remote user interaction data such as cursor positions may be provided to the network computing provider 107 on a continuous basis, while in other embodiments of remote session browse configurations remote user interaction data may only be provided to the network computing provider 107 when associated with a user interaction that requires remote processing.

At block 1118, the client computing device 102 obtains an updated processing result from the network computing provider 107, the network computing provider 107 having processed the remote user interaction data to generate an updated representation of the content. At block 1120, the client computing device 102 performs any additional processing required on the updated processing result (based on the remote session browsing configuration) and at block 1122 displays the updated processing result in the content display area of the browser. At block 1124 the process user interaction routine 1102 ends. Illustratively, the routine may be executed again any number of times in response to further user interactions with the browser and displayed content.

Figure 12:
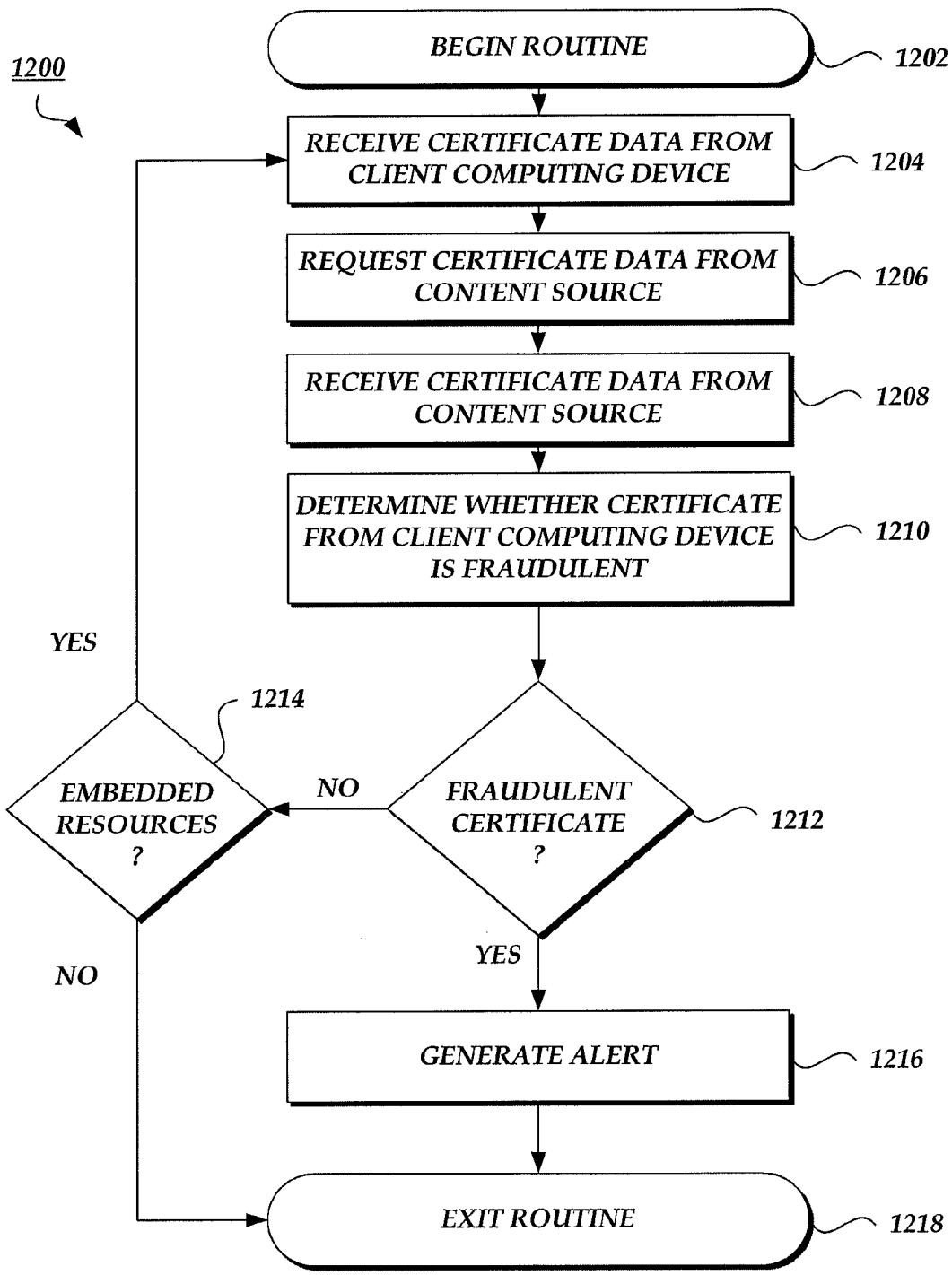
FIG. 12 is a flow diagram illustrative of a routine implemented by a network computing provider for processing and detecting fraudulent digital certificates.

FIG. 12 illustrates a routine 1200 implemented by a network computing provider 107 for receiving and processing certificate data received from a client computing device 102. As described in detail above, a client computing device 102 can transmit encrypted communications to a content provider 104, for example HTTPS communications. Before the encrypted HTTPS communications are transmitted, an SSL handshake can be performed, during which the client computing device 102 and a specific server or other computing component of the content provider 104 agree on communication protocols, encryption and decryption keys, etc. Additionally, during the SSL handshake the client computing device 102 may receive identification data from the server indicating that the server is indeed associated with the content provider 107 with which the client computing device 102 wishes to transmit encrypted or otherwise secure communications. For example, the identification data may include a digital certificate, signed by a third-party certificate authority. If the client computing device 102 trusts the certificate authority which signed the certificate, and if the digital certificate indicates that the server is associated with the content provider 104, then the client computing device 102 can proceed with the exchanged of encrypted communications under the assumption that the server is indeed associated with the content provider 104.

One problem, among others, presented by the use of digital certificates signed by trusted certificate authorities is that if a certificate authority has been compromised, signed digital certificates may be fraudulently generated. For example, if a malicious user gains access to a certificate authority's internal network or otherwise gains access to the encryption keys utilized by the certificate authority, the malicious user may generate signed digital certificates for a server, identifying the server as being associated with a content provider 104, without the certificate authority properly authenticating the identity of the server with the content provider 104 or authorizing the generation of the digital certificate. In such a case, a client computing device 102 which trusts the certificate authority might assume that a server presenting a fraudulent digital certificate is associated with an intended content provider 104, when in fact the server is not associated with the intended content provider 104. A client computing device 102 may contact a fraudulent server instead of a server actually associated with the target content provider 104 if, for example, the DNS server that the client computing device 102 uses to resolve IP addresses has been compromised. In response to a user entering a URL of a content provider 104, such as https://www.xyzwebsite.com, into a browser on the client computing device 102, the browser can contact a DNS server and request an IP address for the content provider 104. If the DNS server has been compromised, it may return a DNS record with the IP address of a fraudulent server, which then presents a fraudulent digital certificate to the client computing device 102.

While the description that follows describes processing of certificate data for the purpose of identifying potentially fraudulent digital certificates, the description is illustrative only, and is not intended to be limiting. For example, the routine 1200 can be used to detect unexpected certificate data that may not be fraudulent, such as erroneous data that may also expose sensitive data from a client computing device 102 to third parties. In some embodiments, the routine 1200 or some variant thereof can be used to detect changes and variances in the digital certificates, validly obtained, which are presented by servers affiliated with a content provider. In such embodiments, the digital certificates may be legitimately distributed and received. For example, a server could obtain a new certificate from a different certificate authority, and therefore many or all client computing devices 102 may receive the certificate from the different certificate authority. Additionally, servers in different geographical areas may have certificates from different certificate authorities, and each certificate may be validly obtained. Information about such changes and geographical variances can be used to discover trends in certificate issuance and certificate authority preference, and may be useful to certificate authorities, content providers, and to parties conducting research in related matters. The routine 1200 can be used to collect such data and detect patterns, and then to provide the results to the certificate authorities, content providers, and to third parties for reporting and research purposes.

A client computing device 102 may consult a certificate revocation list (CRL) or generate an Online Certificate Status Protocol (OCSP) request to verify the validity of a certificate before trusting the server presenting the certificate. However, these solutions introduce other potential problems, including waiting for responses before proceeding, increased computation required by the client computing device 102, the potential to be affected by denial-of-service attacks directed at the CRL provider or OCSP responder, etc. Embodiments described herein facilitate detection of fraudulent certificates without requiring a client computing device to consult a CRL or generate an OCSP request. It should be noted, however, that the claimed subject matter is not limited to implementations that solve any or all disadvantages noted in any part of this disclosure.

The routine 1200 begins at block 1202, and proceeds to 1204 where a network computing provider 107 receives certificate data from a client computing device 102. As described above, the client computing device 102 may have received a digital certificate during and SSL handshake with a content provider 104. The client computing device 102 can transmit data containing some or all of the information in the digital certificate to a network computing provider 107 to detect whether the digital certificate may be fraudulent. Unlike a CRL or an OCSP request, the client computing device can transmit the certificate data to the network computing provider 107 without wafting for, or even expecting a response. The client computing device 102 can complete the SSL handshake and begin encrypted communications with the server which identified itself as being associated with the content provider 104 while the network computing provider 107 determines whether the digital certificate is fraudulent. The network computing provider 107 may be configured with computing capacity and network bandwidth that allows the network computing provider 107 to process the certificate data, detect a fraudulent certificate, and alert the client computing device 102 before the client computing device 102 has transmitted any substantial amount of sensitive data to the server. In some embodiments, the client computing device 102 can be configured to wait for a response from the network computing provider 107 confirming the validity of the digital certificate before proceeding. In some embodiments, the client computing device 102 can proceed with the SSL and secure transmission, while preventing certain sensitive data, such as credit card information, social security numbers, etc., from being transmitted until a response is received from the network computing provider 107. In response to receiving the certificate data from the client computing device 102, the routine 1200 can proceed to block 1206.

At block 1206, the network computing provider 107 can request a digital certificate from the content provider 104. The digital certificate requested from the content provider 104 can be used as described below to aid in determining whether the digital certificate received by the client computing device 102 is fraudulent.

At block 1208, the network computing provider 107 can receive the requested digital certificate data from the content provider 104. In some embodiments, the network computing provider 107 can receive certificate data from a plurality of client computing devices 102 simultaneously, in real time, or substantially in real time. For example, the network computing provider 107 may receive certificate data for a single content provider 104 from many thousands of client computing devices 102 in less than one minute. The network computing provider 107 can utilize this data to determine statistical trends and for other comparisons, as described in detail below. In some embodiments, the network computing provider 107 can also retrieve historical certificate data to aid in the determination. For example, each time the network computing provider 107 receives certificate data from a client computing device 102, the network computing provider 107 can store the certificate data for future use. The network computing provider 107 can retrieve all or a subset of all historical data related to the content provider 104 in order to determine which servers have presented valid digital certificates associating them with the content provider. In some embodiments, the network computing provider 107 can retrieve historical data instead of requesting and receiving a new copy of the digital certificate from the content provider 104. In response to receiving, receiving, or loading the certificate data, the routine 1200 can proceed to block 1210.

At block 1210, the network computing provider 107 can compare the certificate from the client computing device 102 with the certificate received from the content provider 104 to determine whether there is a difference between the two, and therefore whether one of them is erroneous or potentially fraudulent. For example, the network computing provider 107 can determine whether the certificate received from the content provider 104 is signed by a different certificate authority than the digital certificate received from the client computing device 102. If the digital certificates are signed by different certificate authorities, then one may be fraudulent. The network computing provider 107, due to its faster network connection and greater computing capacity when compared to the client computing device 102, may perform other tests to ensure that the digital certificate received by the network computing provider 107 from the content source 104 is not fraudulent. For example, as described above with respect to block 1208, the network computing provider 107 can receive certificate data from a large number of client computing devices 102 at or near the same time as the certificate data received from the specific client computing device 102 of this example. Additionally, the network computing provider 107 can store some or all certificate data received from client computing devices 102 or directly from content providers 104 for any length of time. The network computing provider 107 can load and process this data, determining patterns in the certificates received by various client computing devices 102 and directly from content providers 104. For example, the client computing devices 102 may transmit geolocation data to the network computing provider 107 along with the certificate data, and the network computing provider 107 may store the geolocation data. The network computing provider 107 may determine that client computing devices 102 in different geographic locations receive different certificates, while client computing devices 102 in similar geographic locations tend to receive similar digital certificates. The network computing provider 107 can utilize such patterns in the historical data to confirm that a particular digital certificate received by a client computing device 102 is not fraudulent even though it may have been signed by a different certificate authority and identify a different server than the digital certificate received by the network computing provider 107 or even a majority of client computing devices 102.

The network computing provider 107 need not be limited to geographic data when determining patterns in the historical data. For example, the network computing provider 107 may store other data with the historical certificate data received from client computing devices 102, including time stamps, device profile information, etc. Additionally, the network computing provider 107 is not limited to comparing only the signing certificate authority of the certificates when determining differences or otherwise detecting fraudulent digital certificates. For example, the network computing provider 107 can consider a server IP address identified in the digital certificate, a serial number of the digital certificate, etc. In response to determining whether or not the certificate received from the client computing device 102 in block 1204 of current execution of the routine 1200 is erroneous or fraudulent, the routine 1200 can proceed to decision block 1212.

At decision block 1212, the network computing provider 107 can determine whether to proceed to block 1216, or to decision block 1214, based on whether the certificate received form the client computing device 102 is fraudulent. In response to determining that the digital certificate received form the client computing device 102 is fraudulent, or likely to be fraudulent, or has a probability of being fraudulent that exceeds a predetermined or dynamically determined threshold, or is otherwise erroneous, the routine 1200 can proceed to block 1216, where it generates an alert. The alert generated in block 1216 can be transmitted to the client computing device 102, and can include data about the potential fraud that was detected. Other information can also be included in the alert transmission, for example a bitmap imaged of a web page hosted by the server that transmitted the fraudulent digital certificate. The network computing provider 107 can generate and transmit an alert to the content provider 104 instead of, or in addition to, any alert generated and transmitted to the client computing device 102. In this way, the content provider 104 can be made aware of fraudulent digital certificates being presented to users attempting to access the content provider 104. Alerts can also be generated and transmitted to the certificate authority, etc.

In response to determining that the digital certificate received from the client computing device 102 is not fraudulent, or is not likely to be fraudulent, or has a probability of being fraudulent that does not exceed a predetermined or dynamically determined threshold, or is not otherwise erroneous, the network computing provider 107 can proceed to decision block 1214. At decision block 1214, the network computing provider can determine whether there are any embedded network resources that have presented or will present digital certificates. For example, if the client computing device 102 was requesting a web site from a content provider 104, the web site may have any number of network resourced embedded within the web site, for example videos, images, applets, iframes, etc. The embedded resources may reside on any server associated with any content source, such as the same content provider 104, a different content provider 104, a CDN service provider 106, etc. Just as the server that the client computing device 102 originally contacted may present a fraudulent digital certificate, so may any of the content sources hosting an embedded resource. If the network computing provider 107 determines that there are embedded resources, the routine 1200 can return to block 1204 to wait for, receive, and process any additional digital certificates received from the client computing device 102.

If the are no embedded resources, or no more embedded resources, as determined at decision block 1214, or an alert has been generated at block 1216, execution of the routine 1200 can proceed to block 1218. At block 1218, the routine 1200 terminates.

Figure 13:
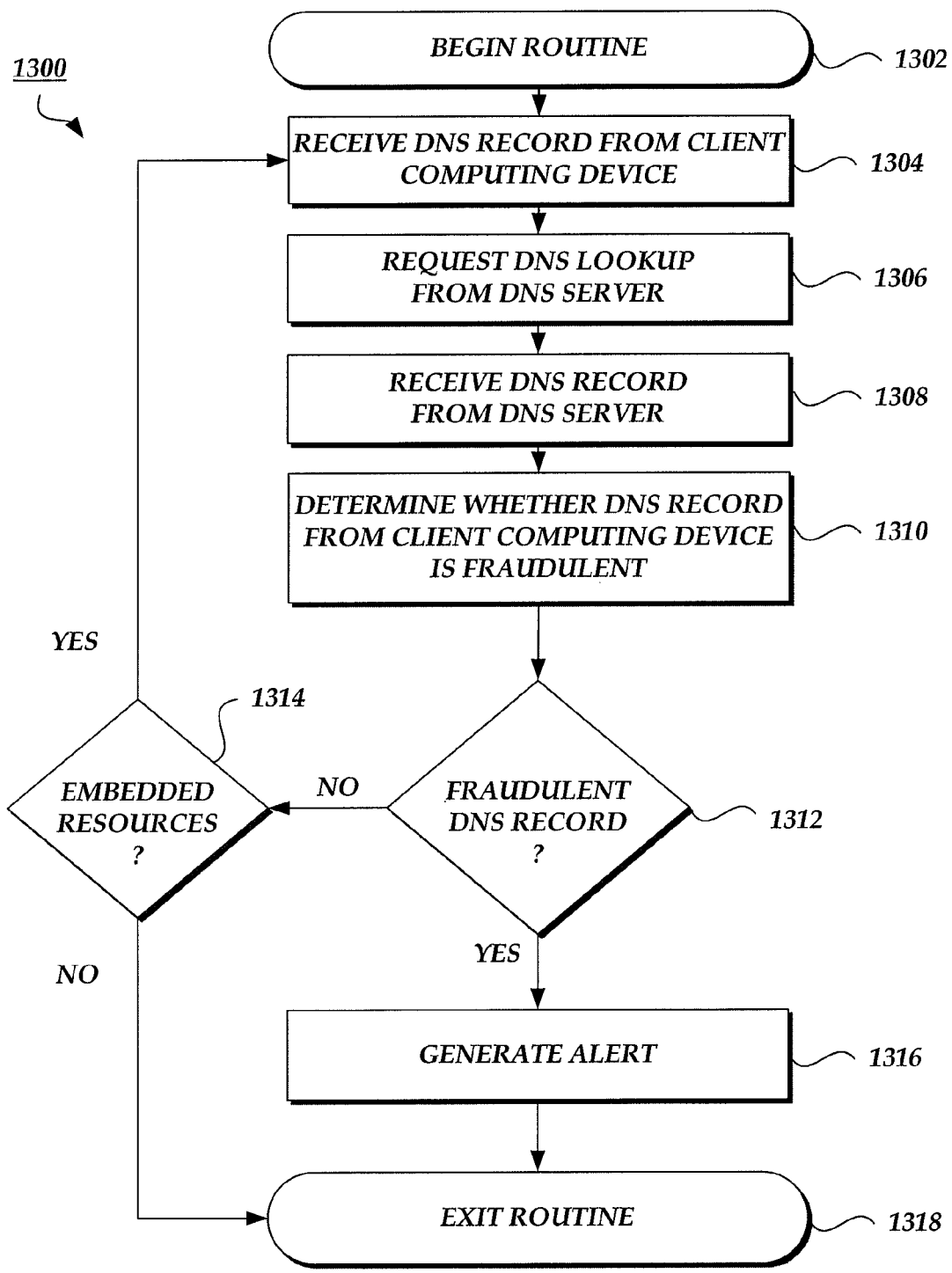
FIG. 13 is a flow diagram illustrative of a routine implemented by a network computing provider for processing and detecting fraudulent DNS records.

FIG. 13 illustrates a routine 1300 implemented by a network computing provider 107 for receiving and processing DNS record data received from a client computing device 102. As described in detail above, a client computing device 102 may contact a fraudulent server instead of a server actually associated with the target content provider 104 if, for example, the DNS server that the client computing device 102 uses to resolve IP addresses has been compromised. In response to a user entering a URL of a content provider 104, such as https://www.xyzwebsite.com, into a browser on the client computing device 102, the browser can contact a DNS server and request an IP address for the content provider. If the DNS server has been compromised, it may return a DNS record with the IP address of a fraudulent server, which then presents a fraudulent digital certificate to the client computing device 102. The client computing device 102 can be configured to transmit some or all DNS lookup information to the network computing 107 to determine if the DNS record received by the client computing device 102 is fraudulent.

While the description that follows describes processing of data for the purpose of identifying potentially fraudulent DNS records, the description is illustrative only, and is not intended to be limiting. For example, the routine 1300 can be used to detect erroneous DNS records that may not be fraudulent, as such erroneous data may also expose sensitive data from a client computing device 102 to third parties. In addition, just as with digital certificates, the routine 1300 can be used to detect changes and variances in the valid DNS records received over time, in different geographical areas, etc.

The routine 1300 begins at block 1302, and proceeds to 1304 where a network computing provider 107 receives one or more DNS records from a client computing device 102. As described above, the client computing device 102 may have received a DNS record from a DNS server after requesting a DNS lookup. The client computing device 102 can transmit data containing some or all of the information in the DNS record to a network computing provider 107 to detect whether the DNS record may be fraudulent. The client computing device 102 can proceed to contact and communicate with the server at the IP address in the DNS record while the network computing provider 107 determines whether the DNS record is fraudulent. The network computing provider 107 may be configured with computing capacity and network bandwidth that allows the network computing provider 107 to process the DNS record, detect whether it is fraudulent, and alert the client computing device 102 before the client computing device 102 has completed any substantial communications with the server. In some embodiments, the client computing device 102 can be configured to wait for a response from the network computing provider 107 confirming the validity of the DNS record before proceeding. In some embodiments, the client computing device 102 can proceed with the communication while preventing certain sensitive data, such as credit card information, social security numbers, etc., from being transmitted until a response is received from the network computing provider 107. In response to receiving the DNS record from the client computing device 102, the routine 1300 can proceed to block 1306.

At block 1306, the network computing provider 107 can request a DNS lookup from a DNS server. The DNS record requested from the DNS server can be used as described below to aid in determining whether the DNS record by the client computing device 102 is fraudulent.

At block 1308, the network computing provider 107 can receive the requested DNS record from the DNS server. In some embodiments, the network computing provider 107 can also retrieve historical DNS records to aid in the determination. For example, each time the network computing provider 107 receives a DNS record from a client computing device 102, the network computing provider 107 can store the DNS record for future use. The network computing provider 107 can retrieve all or a subset of all historical data related to the content provider 104 in order to determine which DNS servers have presented valid DNS records. In some embodiments, the network computing provider 107 can retrieve historical data instead of requesting and receiving a new DNS record from a DNS server. In response to receiving, receiving, or loading the DNS record or records, the routine 1300 can proceed to block 1310.

At block 1310, the network computing provider 107 can compare the DNS record from the client computing device 102 with the DNS record received directly from the DNS server to determine whether there is a difference between the two, and therefore whether one of them is fraudulent. For example, the network computing provider 107 can determine whether the DNS record received from the content provider 104 includes a different IP address than the DNS record received from the client computing device 102. The network computing provider 107, due to its faster network connection and greater computing capacity when compared to the client computing device 102, may perform other tests to ensure that the DNS record received by the network computing provider 107 from the DNS server is not fraudulent. For example, as described above with respect to block 1308, the network computing provider 107 can store some or all DNS records received from client computing devices 102 or directly from DNS servers for any length of time. The network computing provider 107 can load and process this data, determining patterns in the DNS records received by various client computing devices 102 and directly from DNS servers. For example, the client computing devices 102 may transmit geolocation data to the network computing provider along with the DNS record, and the network computing provider 107 may store the geolocation data. The network computing provider 107 may determine that client computing devices 102 in different geographic locations receive different DNS records, while client computing devices 102 in similar geographic locations tend to receive similar DNS records. The network computing provider 107 can utilize such patterns in the historical data to confirm that a particular DNS record received by a client computing device 102 is or is not fraudulent, based on whether it includes a different IP address than the DNS record received by the network computing provider 107 or even a majority of client computing devices 102.

Similar to the digital certificate processing routine 1200 described above, the network computing provider 107 need not be limited to geographic data when determining patterns in the historical data, and is not limited to determining different IP addresses in the historical DNS records. In response to determining whether or not the DNS record received from the client computing device 102 in block 1304 of current execution of the routine 1300 is fraudulent, the routine 1300 can proceed to decision block 1312.

At decision block 1312, the network computing provider 107 can determine whether to proceed to block 1316, or to decision block 1314, based on whether the DNS record received form the client computing device 102 is fraudulent. In response to determining that the DNS record received form the client computing device 102 is fraudulent, or likely to be fraudulent, or has a probability of being fraudulent that exceeds a predetermined or dynamically determined threshold, the routine 1300 can proceed to block 1316, where it generates an alert. The alert generated in block 1316 can be transmitted to the client computing device 102, and can include data about the potential fraud that was detected. As in routine 1200 described above, other information can also be included in the alert transmission. The network computing provider 107 can also generate and transmit an alert to the DNS server or content provider 104 instead of, or in addition to, any alert generated and transmitted to the client computing device 102. In this way, the DNS server or content provider 104 can be made aware of fraudulent DNS records being returned to users requesting DNS lookups.

In response to determining that the DNS record received from the client computing device 102 is not fraudulent, or is not likely to be fraudulent, or has a probability of being fraudulent that does not exceed a predetermined or dynamically determined threshold, the network computing provider 107 can proceed to decision block 1314. At decision block 1314, the network computing provider can determine whether there are any embedded network resources that have required or will require DNS lookups. For example, if the client computing device 102 was requesting a web site from a content provider 104, the web site may have any number of network resourced embedded within the web site, for example videos, images, applets, iframes, etc. The embedded resources may reside on any server associated with any content source, such as the same content provider 104, a different content provider 104, a CDN service provider 106, etc. Just as the DNS server from which the client computing device 102 requested a DNS lookup regarding the original network resource, the DNS server may present a fraudulent DNS record for any embedded resource. If the network computing provider 107 determines that there are embedded resources, the routine 1300 can return to block 1304 to wait for, receive, and process any additional DNS records received from the client computing device 102.

If the are no embedded resources, or no more embedded resources, as determined at decision block 1314, or an alert has been generated at block 1316, execution of the routine 1300 can proceed to block 1318. At block 1318, the routine 1300 terminates.

Figure 14:
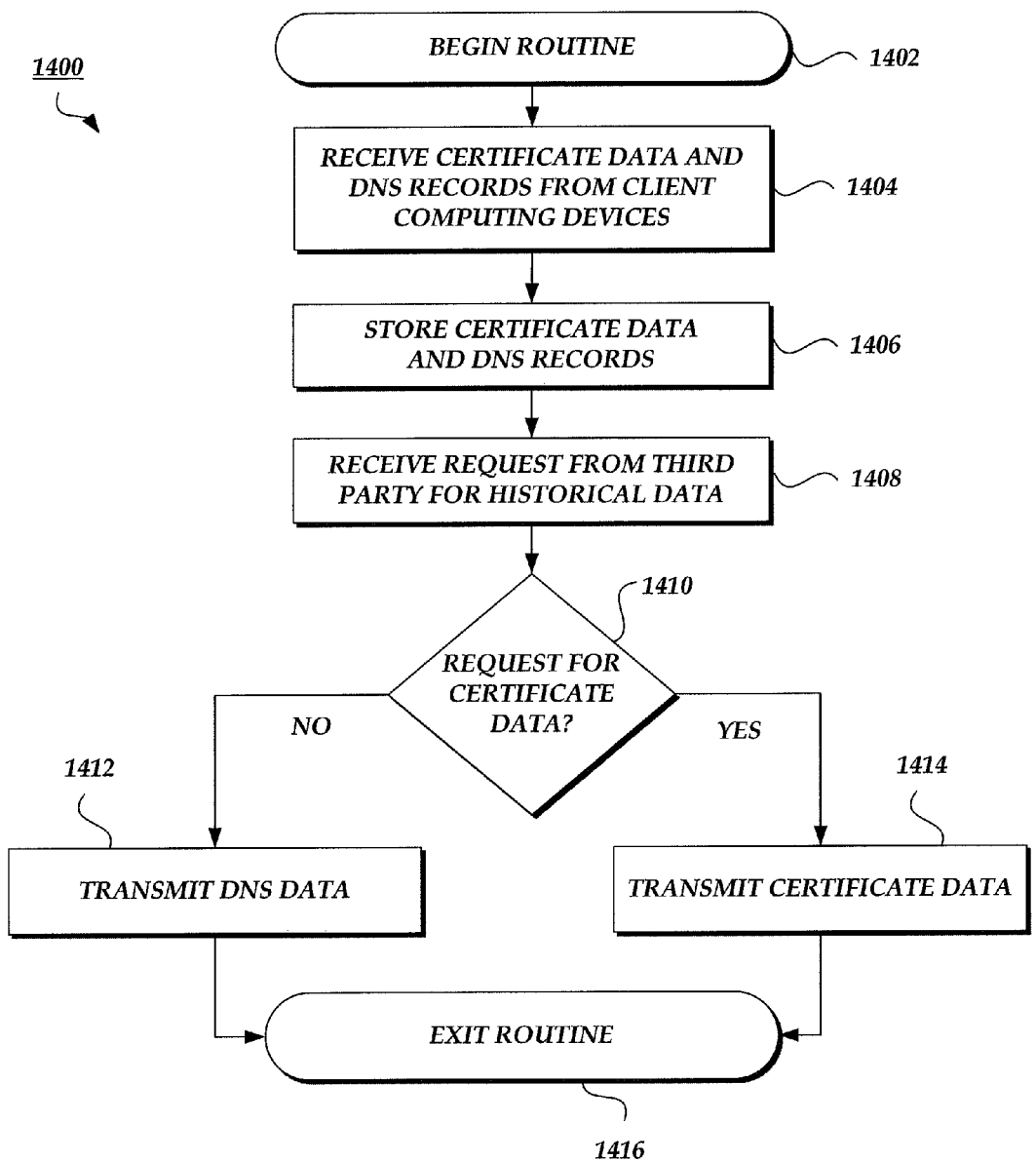
FIG. 14 is a flow diagram illustrative of a routine implemented by a network computing provider for processing and responding to requests, from a content source or DNS server, for historical certificate data and DNS records.

FIG. 14 illustrates a routine 1400 implemented by a network computing provider 107 for receiving certificate data and DNS records from any number of client computing devices 102, DNS servers, content providers 104, CDN service providers 106, etc. As described in detail above, a client computing device 102 can transmit encrypted communications to a content provider 104, for example HTTPS communications. The client computing device 102 may request DNS lookups and receive DNS records containing the IP address of a server associated with the content provider 104. The client computing device may the initiate an SSL handshake with the server at that IP address before the encrypted HTTPS communications are transmitted. During the SSL handshake, the client computing device 102 may receive a digital certificate, signed by a third-party certificate authority, identifying the server as being associated with the content source. If the DNS record or digital certificate are fraudulent, the client computing device 102 may transmit sensitive information to a server not associated with the intended recipient of the information.

By receiving and storing DNS records and digital certificates received by client computing devices 102, the network computing provider 107 may be in a position to provide important data to DNS providers, content providers 104, and certificate authorities, among others, regarding any identification data variances or potentially fraudulent activity associated with those entities. This important data can be provided to those entities on demand, through an API or web service, as part of a subscription reporting service, or in any other appropriate manner. In some embodiments, the access can be provided for compensation, as part of a service in which the DNS provider, content provider, certificate authority, or a third party receives regular reports, on-demand access, or other access to the data in return for a fee.

The routine 1400 begins at block 1402 and proceeds to block 1404, where the network computing provider 107 receives, from client computing devices, certificate data, DNS records, and/or any other identification data related to content providers 104 contacted by the client computing devices 102. In response to receiving such data, the routine 1400 can proceed to block 1406.

At block 1406, the network computing provider 107 may store the data in an electronic storage such as a hard disk, memory, database, magnetic tape, or any appropriate storage medium. The storage of data at block 1406 can occur while the network computing provider 107 is receiving new data at block 1404. For example, the network computing provider 107 need not halt the reception of new data at block 1404 in order to store previously received data at block 1406, but rather the network computing provider 107 can continuously and simultaneously receive and store data, potentially from thousands or millions of client computing devices 102, for many hours or even years without pausing.

At block 1408, the network computing provider can receive a request for from a third party for historical data. The third party can be a content provider 104, a CDN service provider, or any other content source. In some embodiments, the third party can be a DNS sever or a certificate authority. In some embodiments, historical data can be provided to the general public, either anonymously or as part of a subscription server. In some embodiments, the historical data is withheld from public disclosure for privacy or other reasons. In response to receiving a request from a third party authorized to receive historical data, the routine 1400 can proceed to decision block 1410.

At decision block 1410, the network computing provider 107 can determine the specific details of the request received at block 1408. For example, when a network computing provider 107 stores digital certificate data and DNS records, a third party may request one or both types of data. Illustratively, when a third party, such as a certificate authority, requests certificate data in order to determine whether fraudulent certificates are being presented bearing the certificate authority's signature, the routine 1400 can proceed to block 1414. When a third party, such as a content provider 104, requests DNS records in order to determine whether fraudulent DNS records are being returned from DNS lookups for the content provider's 104 IP address, the routine 1400 can proceed to block 1412.

At block 1412, the network computing provider 107 can retrieve and transmit DNS records to the requesting party. The data can be transmitted to the requesting party in a formatted report, in a raw data dump, etc. In some embodiments, the data can be made available to third parties through a query interface. In such a configuration, the third party could not only make general requests for data or receive report, but rather could construct and execute queries through an API exposed by the network computing provider 107.

At block 1414, the network computing provider 107 can retrieve and transmit certificate data to the requesting party. The data can be transmitted to the request party in a formatted report, in raw data dump, etc. As described above with respect to block 1412, the data can be made available through a query interface or other API in addition to, or in place of, a subscription report service or on demand data dump service.

In response to transmitting the requested data to the third party, either in block 1412 or block 1414, described above, the routine 1400 can proceed to block 1416, where execution terminates.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow remote processing management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

Any process descriptions, elements, or blocks in the flow diagrams described herein and/or depicted in the attached FIGURES should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for detecting differences between digital certificates, the method comprising:
   under the control of a server system comprising one or more hardware-based computer processors configured to execute specific instructions, wherein the server system is separate from a content source and a user computing device,
   receiving, by the server system, a first certificate data from the user computing device, the first certificate data comprising a first digital certificate asserting the identity of the content source, wherein the first digital certificate is signed by a certificate authority, and wherein the first digital certificate was previously obtained by the user computing device in connection with a secure content request, originating from the user computing device, for content hosted by the content source; and
   in response to receiving the first certificate data from the user computing device:
      retrieving, by the server system, a second certificate data from the content source responsive to a request transmitted by the server system to the content source, the second certificate data comprising a second digital certificate identifying the same content source as the first digital certificate, the second digital certificate signed by a certificate authority; and
      determining, by the server system, that the first digital certificate is fraudulent based at least partly on comparing the first certificate data to the second certificate data and identifying a difference.

2. The computer-implemented method of claim 1, wherein the difference between the first certificate data and the second certificate data comprises the certificate authority signing the first digital certificate being different than the certificate authority signing the second digital certificate.

3. The computer-implemented method of claim 1 further comprising generating an alert to the user computing device in response to identifying the difference.

4. The computer-implemented method of claim 1 further comprising generating an alert to the content source in response to identifying the difference.

5. The computer-implemented method of claim 1 further comprising storing at least one of the first certificate data, the second certificate data, or data indicating the difference between the first certificate data and the second certificate data.

6. The computer-implemented method of claim 5 further comprising:
receiving a plurality of certificate data from a plurality of user computing devices, each of the plurality of certificate data received from the plurality of user computing devices comprising a digital certificate asserting the identity of the content source; and
identifying a difference between the first certificate data and at least one of the plurality of certificate data received from the plurality of user computing devices.

7. The computer-implemented method of claim 5 further comprising providing the content source with access to at least a portion of the first certificate data.

8. The computer-implemented method of claim 1, further comprising determining a likelihood probability that the first digital certificate is fraudulent based at least in part on the difference.

9. The computer-implemented method of claim 1, wherein comparing the first certificate data to the second certificate data comprises at least one of: comparing an IP address identified in the first certificate data to an IP address in the second certificate data; comparing a serial number in the first certificate data to a serial number in the second certificate data; or comparing a certificate authority identified in the first certificate data to a certificate authority identified in the second certificate data.

10. A system for detecting differences between digital certificates, the system comprising:
a network computing provider comprising a network computing component executing on one or more physical network computing devices, wherein each physical network computing device comprises hardware configurable to execute specific computing instructions, the network computing component configured to:
receive a first certificate data from a user computing device, the first certificate data comprising a first digital certificate asserting the identity of a content source separate from the network computing provider and the user computing device, the first digital certificate signed by a certificate authority, wherein the first digital certificate was previously obtained by the user computing device in connection with a secure content request, originating from the user computing device, for content hosted by the content source;
receive a plurality of related certificate data from one or more other user computing devices separate from the user computing device, each of the related certificate data comprising a digital certificate asserting the identity of the same content source as the first certificate data, wherein each of the digital certificates of the related certificate data was previously obtained by a respective user computing device, of the one or more other user computing devices, in connection with a secure content request, originating from the respective user computing device, for content hosted by the content source;
determine representative certificate data from the plurality of related certificate data based at least partly on an analysis of the plurality of related certificate data; and
determine whether the first digital certificate is fraudulent based at least partly on a difference between the first certificate data and the representative certificate data.

11. The system of claim 10, wherein the difference between the first certificate data and the representative certificate data comprises the certificate authority signing the first digital certificate being different than the certificate authority signing the digital certificate of the representative certificate data.

12. The system of claim 10 further comprising generating an alert to the user computing device in response to determining the difference.

13. The system of claim 10 further comprising generating an alert to the content source in response to determining the difference.

14. The system of claim 10 further comprising storing the first certificate data.

15. The system of claim 14 further comprising providing the content source with access to at least a portion of the first certificate data.

16. The system of claim 10 further comprising determining the first digital certificate to be fraudulent based at least in part on the difference.

17. The system of claim 10, wherein the analysis of the plurality of related certificate data comprises:
identifying a subset of the plurality of related certificate data based at least partly on a common characteristic of user computing devices from which individual certificate data of the subset of the plurality of related certificate data was received; and
selecting the representative certificate data from the plurality of related certificate data, wherein the user computing device from which the first certificate data was received is associated with the common characteristic.

18. The system of claim 17, wherein the common characteristic comprises a geographic location or a device profile.

19. A computer-implemented method for detecting differences between DNS records, the method comprising:
under the control of a network computing component executing on one or more physical computing components of a network computing provider, the physical computing components configured to execute specific instructions,
receiving, by the network computing component, a first DNS record from a user computing device, the first DNS record comprising a first IP address of a content source separate from the user computing device, wherein the first DNS record was previously obtained by the user computing device in connection with a content request, originating from the user computing device, for content hosted by the content source; and
in response to receiving the first DNS record from the user computing device:
receiving, by the network computing component, a second DNS record from a DNS server, the second DNS record comprising a second IP address of the same content source as the first DNS record; and
determining, by the network computing component, whether the first DNS record is fraudulent based at least partly on a difference between the first DNS record and the second DNS record.

20. The computer-implemented method of claim 19, wherein the difference between the first DNS record and second DNS record comprises the first IP address being different than the second IP address.

21. The computer-implemented method of claim 19 further comprising generating an alert to the user computing device in response to determining the difference.

22. The computer-implemented method of claim 19 further comprising generating an alert to a DNS provider in response to determining the difference, wherein the DNS provider manages the DNS server.

23. The computer-implemented method of claim 19 further comprising storing the first DNS record.

24. The computer-implemented method of claim 23 further comprising providing a DNS provider with access to at least a portion of the first DNS record, wherein the DNS provider manages the DNS server.

25. The computer-implemented method of claim 19 further comprising determining the first DNS record to be fraudulent based at least in part on the difference.

26. A system for detecting variances in server identification data, the system comprising:
a network computing provider comprising a network computing component executing on one or more physical network computing devices, wherein each physical network computing device comprises hardware configurable to execute specific computing instructions, the network computing component configured to:
receive a plurality of certificate data from a plurality of user computing devices, each of the plurality of certificate data comprising a digital certificate, signed by a certificate authority, asserting the identity of a content source separate from the plurality of user computing devices and separate from the network computing provider, wherein each of the digital certificates of the plurality of certificate data was previously obtained by a respective user computing device of the plurality of user computing devices in connection with a secure content request, originating from the respective user computing device, for content hosted by the content source;
store, in an electronic data store, the plurality of certificate data received from the plurality of user computing devices; and
provide access to at least a portion of the plurality of certificate data stored in the electronic data store, wherein the access is provided to the content source and wherein the portion of the plurality of certificate data is associated with the content source.

27. The system of claim 26, the network computing component further configured to:
receive a plurality of DNS records from the plurality of user computing devices, each of the plurality of DNS records comprising an IP address for the content source;
store, in the electronic data store, the plurality of DNS records received from the plurality of user computing devices; and
provide access to at least a portion of the plurality of DNS records received from the plurality of user computing devices, wherein the access is provided to a DNS provider, and wherein the portion of the plurality of DNS records is associated with the DNS provider.

28. The system of claim 26, the network computing component further configured to:
receive geographical information from at least one of the plurality of user computing devices, the geographical information indicating a physical geographic location of the at least one of the plurality of user computing devices;
store, in the electronic data store, the geographic information received from the at least one of the plurality of user computing devices; and
provide access to at least a portion of the geographic information received from the at least one of the plurality of user computing devices, the access provided to the content source.

* * * * *